US012591623B2

(12) United States Patent
Raja et al.

(10) Patent No.: US 12,591,623 B2
(45) Date of Patent: Mar. 31, 2026

(54) METHOD AND SYSTEM FOR PROVIDING PERSONALIZED MULTIMODAL OBJECTS IN REAL TIME

(71) Applicant: Samsung Electronics Co., Ltd., Suwon-si (KR)

(72) Inventors: Barath Raj Kandur Raja, Bangalore (IN); Sriram Shashank, Bangalore (IN); Sanjana Tripuramallu, Bangalore (IN); Chinmay Anand, Bangalore (IN); Likhith Amarvaj, Bangalore (IN); Vibhav Agarwal, Bangalore (IN); Sumit Kumar, Bangalore (IN); Ankur Agarwal, Bangalore (IN); Yashwant Saini, Bangalore (IN); Guggilla Bhanodai, Bangalore (IN); Kranti Chalamalasetti, Bangalore (IN); Himanshu Arora, Bangalore (IN); Kusumakar Dwivedi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1184 days.

(21) Appl. No.: 17/479,519

(22) Filed: Sep. 20, 2021

(65) Prior Publication Data

US 2022/0004872 A1 Jan. 6, 2022

Related U.S. Application Data

(63) Continuation of application No. PCT/KR2020/003900, filed on Mar. 20, 2020.

(30) Foreign Application Priority Data

Mar. 20, 2019 (IN) .............................. 201941010932
Mar. 17, 2020 (IN) .............................. 201941010932

(51) Int. Cl.
*G06F 16/908* (2019.01)
*G06F 16/2457* (2019.01)
(Continued)

(52) U.S. Cl.
CPC ...... *G06F 16/908* (2019.01); *G06F 16/24578* (2019.01); *G06F 16/90332* (2019.01); *G06F 16/9035* (2019.01); *G06N 3/08* (2013.01)

(58) Field of Classification Search
CPC ......... G06F 16/24578; G06F 16/90332; G06F 16/9035; G06F 16/908; G06N 3/08
(Continued)

(56) References Cited

U.S. PATENT DOCUMENTS 11,093,110 B1 * 8/2021 Bossio ................... G10L 15/26
11,093,971 B2 8/2021 Kurian et al.
(Continued)

FOREIGN PATENT DOCUMENTS

KR 10-2015-0098096 A 8/2015
KR 10-2016-0043557 A 4/2016
(Continued)

OTHER PUBLICATIONS

Office Action dated Nov. 1, 2021 in connection with India Patent Application No. 201941010932, 9 pages.
(Continued)

*Primary Examiner* — Shahid A Alam

(57) ABSTRACT

The present disclosure is related to the field of digital communication and provides a method and system for providing personalized multimodal objects in real-time. An object predicting system receives a text input from at least one application installed in a user device associated with a user. Thereafter, the object predicting system determines an intent of the user by analyzing the text input, which is then correlated with contextual data to generate a query. Subse-
(Continued)

quently, the object predicting system performs a unified search in a universal database, based on the query, wherein the universal database comprises multimodal data. Further, a plurality of multimodal objects predicted in response to the unified search are ranked based on at least one of the contextual data and user preferences. Finally, at least one of the predicted plurality of multimodal objected related to the text input are provided to the user based on the ranking.

15 Claims, 17 Drawing Sheets

(51) Int. Cl.
    *G06F 16/9032*      (2019.01)
    *G06F 16/9035*      (2019.01)
    *G06N 3/08*         (2023.01)

(58) Field of Classification Search
    USPC ........................................................ 707/754
    See application file for complete search history.

(56)                References Cited

U.S. PATENT DOCUMENTS

| | | | | |
|---|---|---|---|---|
| 2006/0106769 | A1* | 5/2006 | Gibbs ................... | G06F 40/274 |
| 2014/0181229 | A1* | 6/2014 | Tucker ............... | H04L 12/1827 |
| | | | | 709/206 |
| 2015/0100537 | A1* | 4/2015 | Grieves ................... | G06N 5/02 |
| | | | | 706/52 |
| 2015/0293602 | A1 | 10/2015 | Kay et al. | |
| 2015/0350118 | A1 | 12/2015 | Yang et al. | |
| 2016/0210963 | A1* | 7/2016 | Kim .................... | G10L 15/1822 |
| 2016/0292148 | A1 | 10/2016 | Aley et al. | |
| 2016/0334970 | A1 | 11/2016 | Mysore Veera et al. | |
| 2017/0180294 | A1* | 6/2017 | Milligan ............... | H04L 51/216 |
| 2017/0185581 | A1* | 6/2017 | Bojja .............. | G06V 30/19173 |
| 2017/0300462 | A1* | 10/2017 | Cudworth ............. | G06F 40/274 |
| 2017/0344224 | A1* | 11/2017 | Kay ...................... | G06F 3/0482 |
| 2017/0357443 | A1 | 12/2017 | Paek et al. | |
| 2018/0018331 | A1* | 1/2018 | Kesamreddy ..... | G06F 16/24578 |
| 2018/0040020 | A1* | 2/2018 | Kurian ................ | G06F 16/9535 |
| 2018/0239770 | A1* | 8/2018 | Ghotbi .................... | G06F 15/76 |
| 2018/0349447 | A1* | 12/2018 | Maccartney ...... | G06F 16/24578 |
| 2018/0356957 | A1* | 12/2018 | Desjardins ........... | G06F 40/274 |
| 2018/0367484 | A1* | 12/2018 | Rodriguez .............. | H04L 67/75 |
| 2019/0379618 | A1* | 12/2019 | Rabbat .................... | G06F 40/20 |
| 2020/0110794 | A1* | 4/2020 | Vos ....................... | G06F 40/279 |
| 2020/0210990 | A1* | 7/2020 | Laracey ............. | G06Q 20/4015 |
| 2021/0073215 | A1* | 3/2021 | Srinivasaraghavan ...................... | |
| | | | | G06F 16/2425 |
| 2022/0091706 | A1* | 3/2022 | Winn ...................... | G06F 16/54 |

FOREIGN PATENT DOCUMENTS

| | | | |
|---|---|---|---|
| KR | 10-2017-0123325 A | 11/2017 | |
| WO | 2017/213684 A1 | 12/2017 | |
| WO | 2018/212885 A1 | 11/2018 | |

OTHER PUBLICATIONS

European Patent Office, Communication pursuant to Article 94(3) EPC issued Feb. 28, 2023 regarding Application No. 20774842.7, 9 pages.

Supplementary European Search Report dated Mar. 29, 2022, in connection with European Application No. 20774842.7, 10 pages.

Oral Proceedings issued Jun. 17, 2024, in connection with European Patent Application No. 20774842.7, 12 pages.

Office Action issued Jul. 11, 2024, in connection with European Patent Application No. 20774842.7, 12 pages.

Summons to attend oral proceedings pursuant to Rule 115(1) EPC dated Feb. 7, 2024, in connection with European Patent Application No. 20774842.7, 11 pages.

International Search Report dated Jun. 30, 2020 in connection with International Patent Application No. PCT/KR2020/003900, 3 pages.

Written Opinion of the International Searching Authority dated Jun. 30, 2020 in connection with International Patent Application No. PCT/KR2020/003900, 5 pages.

* cited by examiner

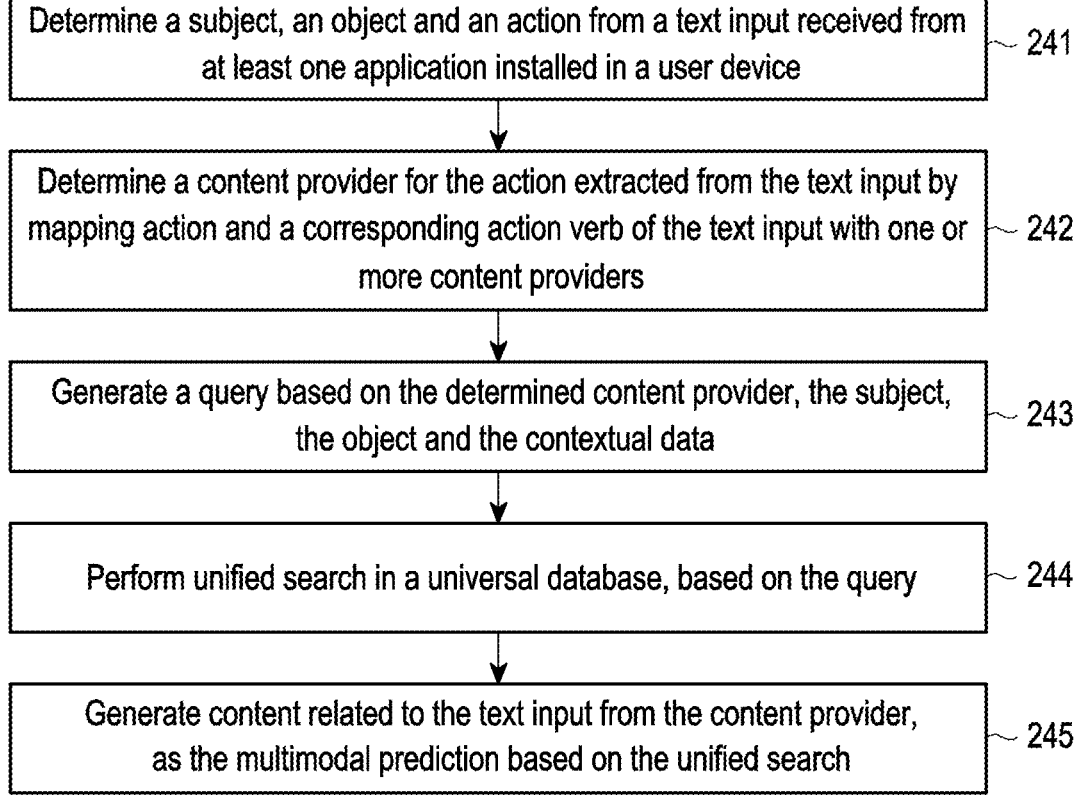

Determine a subject, an object and an action from a text input received from at least one application installed in a user device ～ 241

Determine a content provider for the action extracted from the text input by mapping action and a corresponding action verb of the text input with one or more content providers ～ 242

Generate a query based on the determined content provider, the subject, the object and the contextual data ～ 243

Perform unified search in a universal database, based on the query ～ 244

Generate content related to the text input from the content provider, as the multimodal prediction based on the unified search ～ 245

FIG.2B

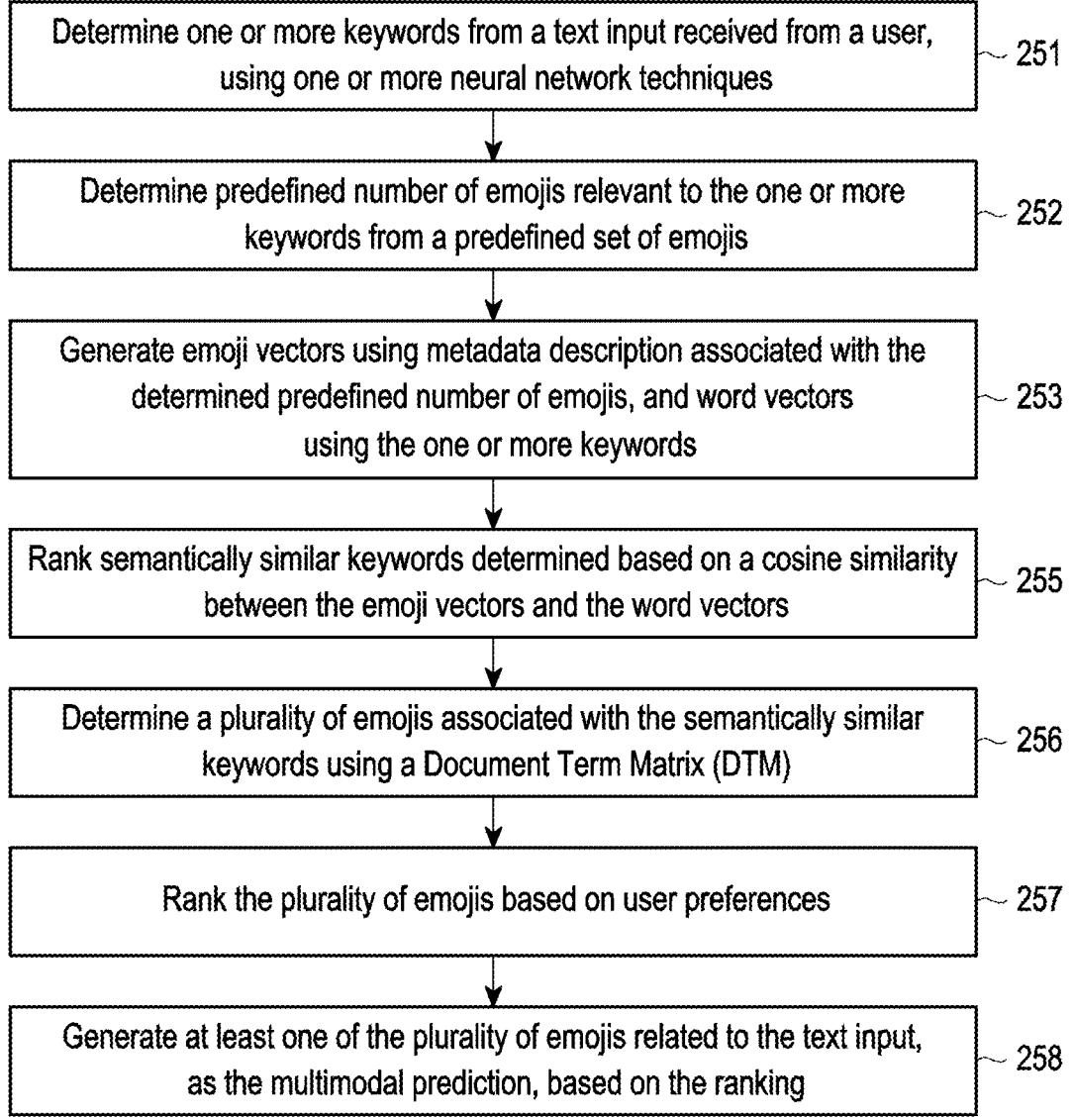

Determine one or more keywords from a text input received from a user, using one or more neural network techniques ~ 251

Determine predefined number of emojis relevant to the one or more keywords from a predefined set of emojis ~ 252

Generate emoji vectors using metadata description associated with the determined predefined number of emojis, and word vectors using the one or more keywords ~ 253

Rank semantically similar keywords determined based on a cosine similarity between the emoji vectors and the word vectors ~ 255

Determine a plurality of emojis associated with the semantically similar keywords using a Document Term Matrix (DTM) ~ 256

Rank the plurality of emojis based on user preferences ~ 257

Generate at least one of the plurality of emojis related to the text input, as the multimodal prediction, based on the ranking ~ 258

FIG.2C

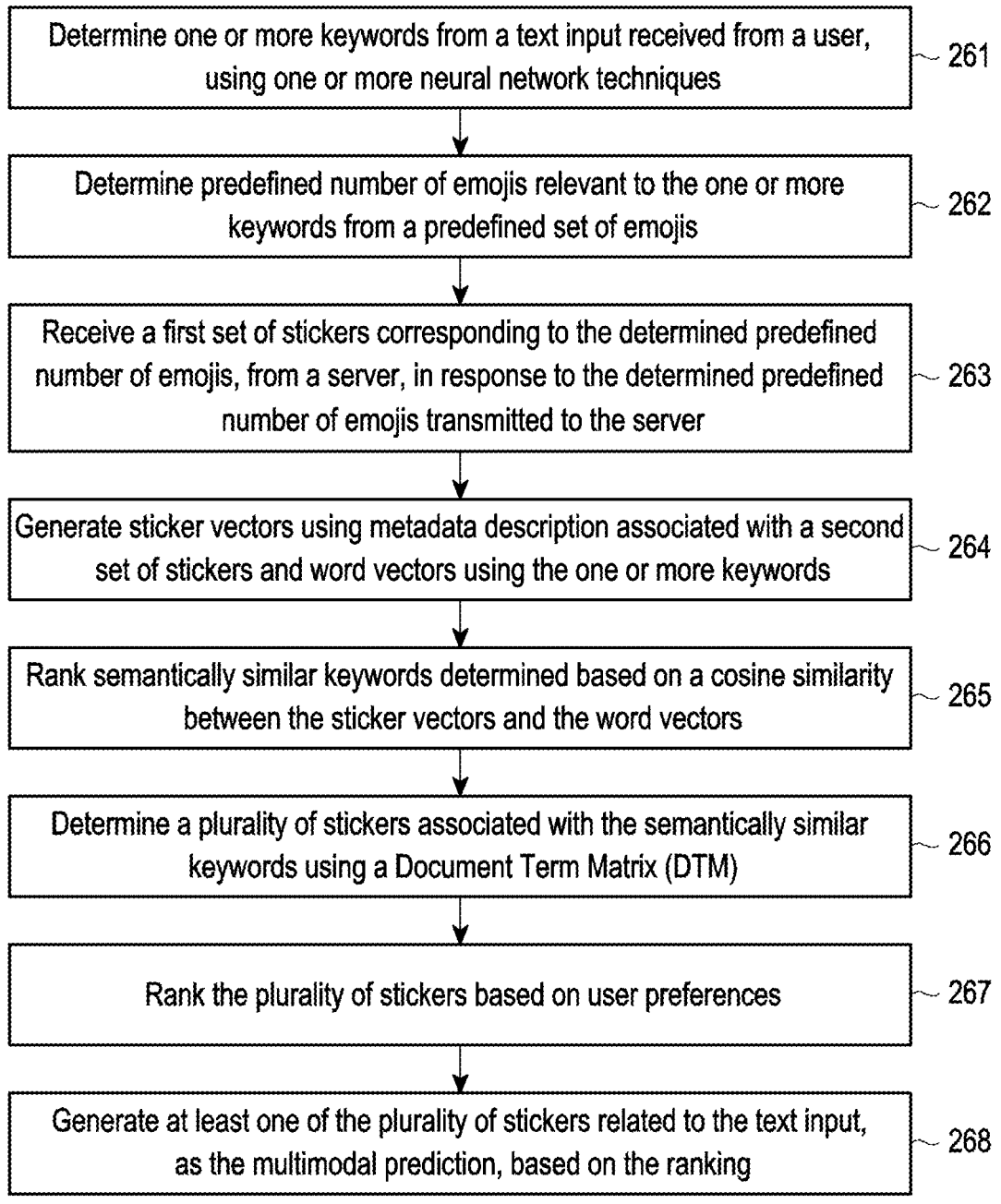

| | |
|---|---|
| Determine one or more keywords from a text input received from a user, using one or more neural network techniques | ~ 261 |
| Determine predefined number of emojis relevant to the one or more keywords from a predefined set of emojis | ~ 262 |
| Receive a first set of stickers corresponding to the determined predefined number of emojis, from a server, in response to the determined predefined number of emojis transmitted to the server | ~ 263 |
| Generate sticker vectors using metadata description associated with a second set of stickers and word vectors using the one or more keywords | ~ 264 |
| Rank semantically similar keywords determined based on a cosine similarity between the sticker vectors and the word vectors | ~ 265 |
| Determine a plurality of stickers associated with the semantically similar keywords using a Document Term Matrix (DTM) | ~ 266 |
| Rank the plurality of stickers based on user preferences | ~ 267 |
| Generate at least one of the plurality of stickers related to the text input, as the multimodal prediction, based on the ranking | ~ 268 |

FIG.2D

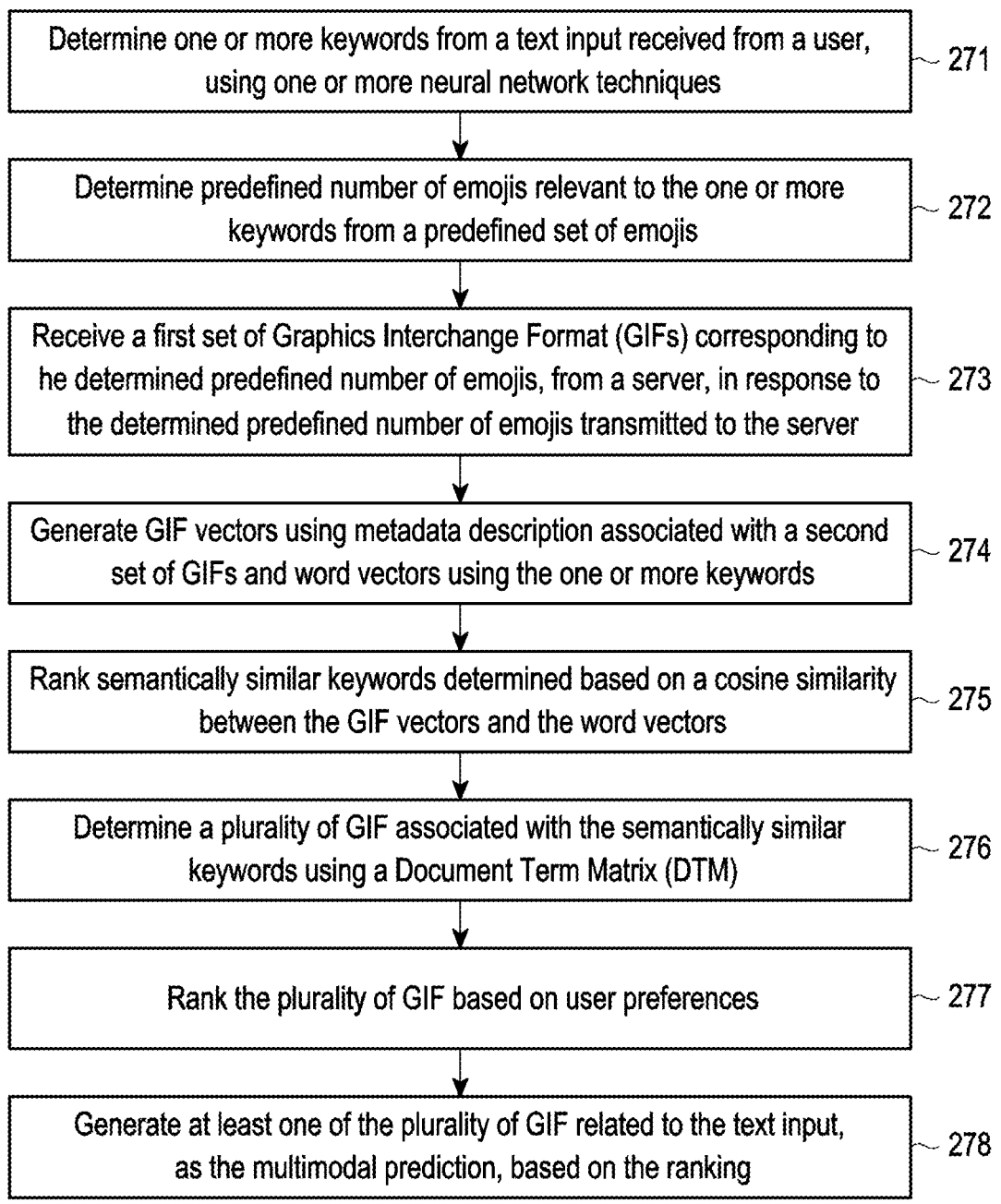

Determine one or more keywords from a text input received from a user, using one or more neural network techniques ~ 271

Determine predefined number of emojis relevant to the one or more keywords from a predefined set of emojis ~ 272

Receive a first set of Graphics Interchange Format (GIFs) corresponding to he determined predefined number of emojis, from a server, in response to the determined predefined number of emojis transmitted to the server ~ 273

Generate GIF vectors using metadata description associated with a second set of GIFs and word vectors using the one or more keywords ~ 274

Rank semantically similar keywords determined based on a cosine similarity between the GIF vectors and the word vectors ~ 275

Determine a plurality of GIF associated with the semantically similar keywords using a Document Term Matrix (DTM) ~ 276

Rank the plurality of GIF based on user preferences ~ 277

Generate at least one of the plurality of GIF related to the text input, as the multimodal prediction, based on the ranking ~ 278

FIG.2E

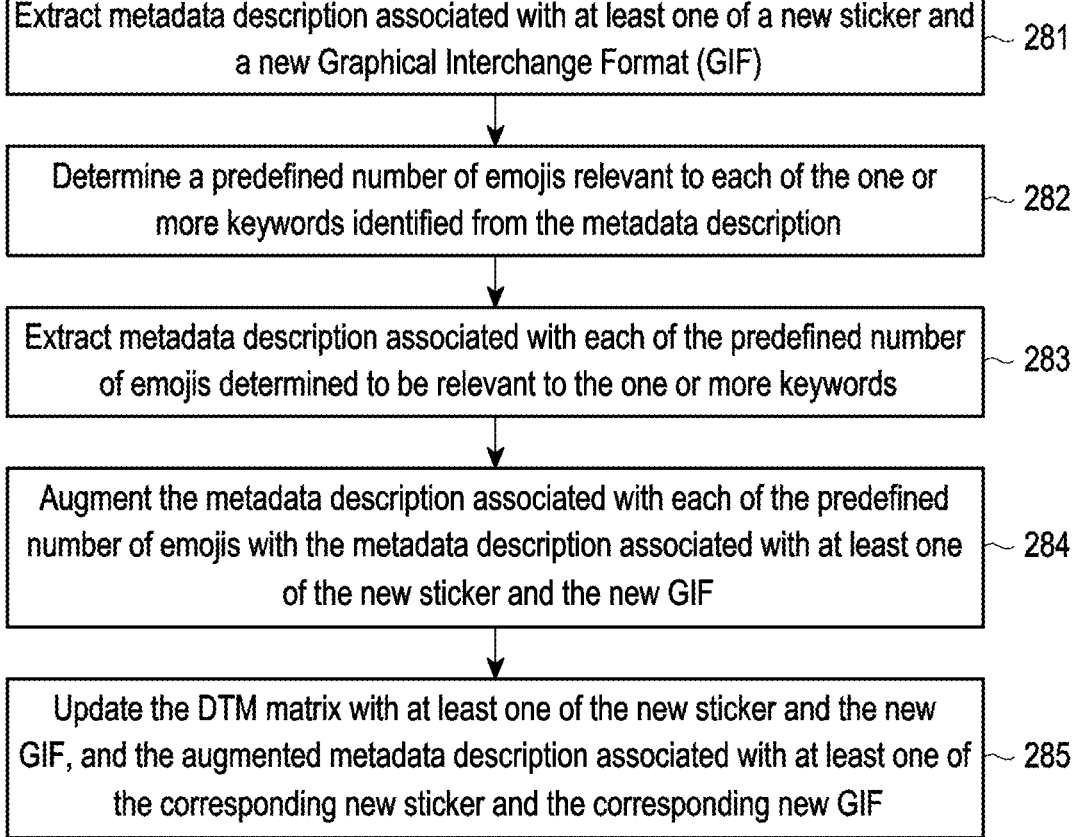

Extract metadata description associated with at least one of a new sticker and a new Graphical Interchange Format (GIF) — 281

Determine a predefined number of emojis relevant to each of the one or more keywords identified from the metadata description — 282

Extract metadata description associated with each of the predefined number of emojis determined to be relevant to the one or more keywords — 283

Augment the metadata description associated with each of the predefined number of emojis with the metadata description associated with at least one of the new sticker and the new GIF — 284

Update the DTM matrix with at least one of the new sticker and the new GIF, and the augmented metadata description associated with at least one of the corresponding new sticker and the corresponding new GIF — 285

FIG.2F

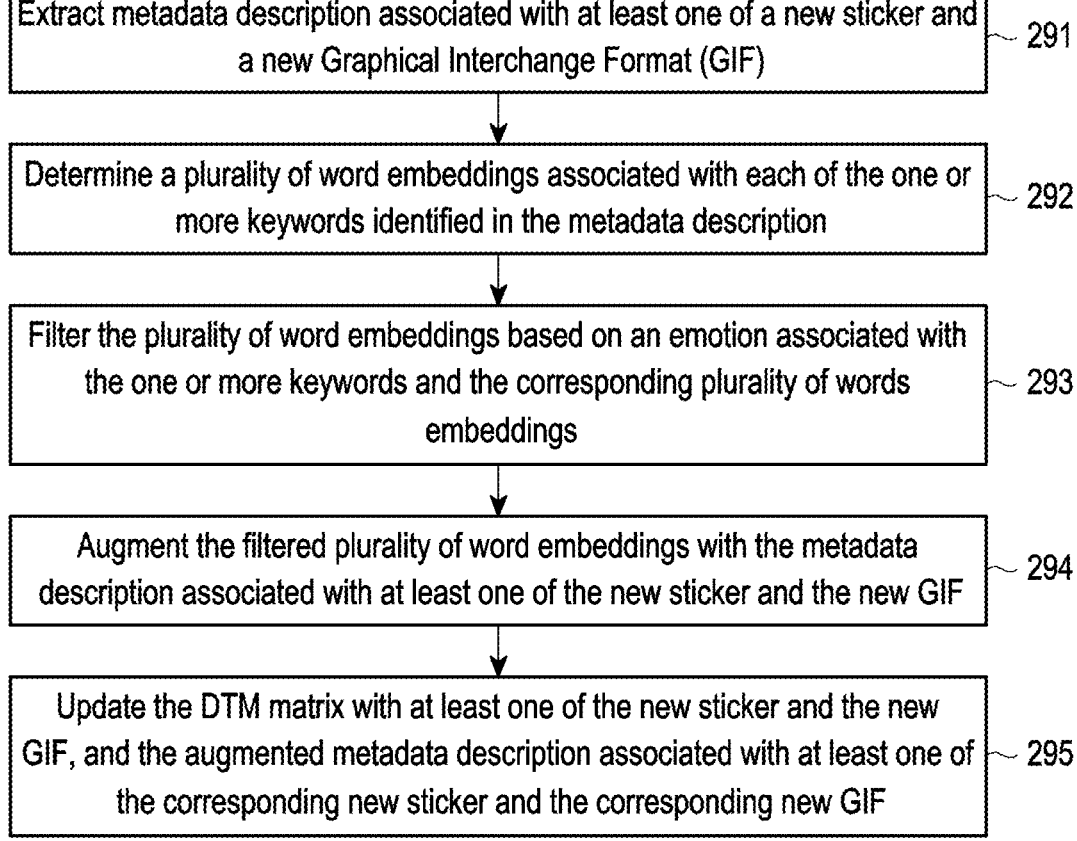

Extract metadata description associated with at least one of a new sticker and a new Graphical Interchange Format (GIF) — 291

Determine a plurality of word embeddings associated with each of the one or more keywords identified in the metadata description — 292

Filter the plurality of word embeddings based on an emotion associated with the one or more keywords and the corresponding plurality of words embeddings — 293

Augment the filtered plurality of word embeddings with the metadata description associated with at least one of the new sticker and the new GIF — 294

Update the DTM matrix with at least one of the new sticker and the new GIF, and the augmented metadata description associated with at least one of the corresponding new sticker and the corresponding new GIF — 295

FIG.2G

Receive a text input from a user through a user device  ~ 296

Perform a unified search in a universal database associated with the object predicting system, based on the text input  ~ 297

Generate a unified view of the multimodal data related to the text input, retrieved by performing the unified search  ~ 298

300

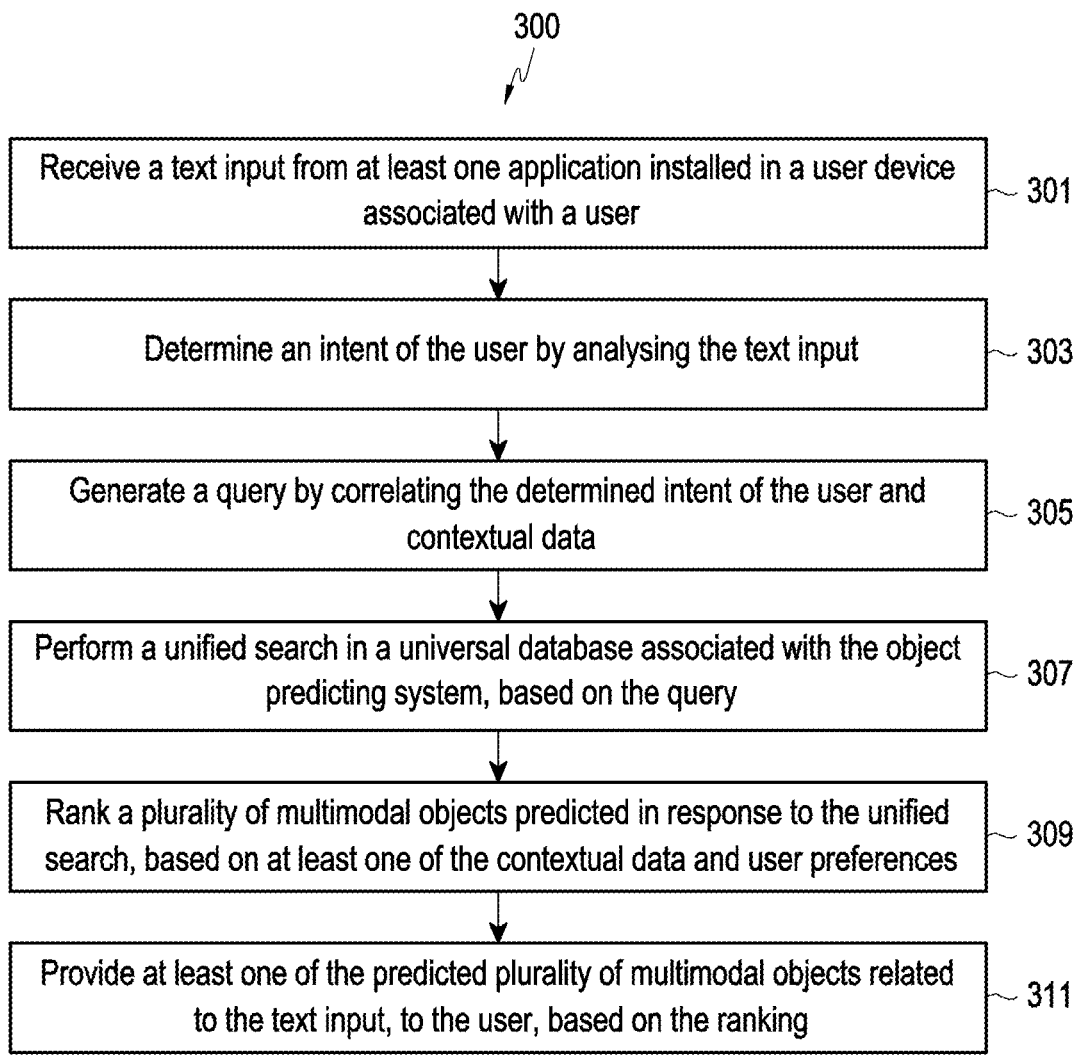

Receive a text input from at least one application installed in a user device associated with a user ~ 301

Determine an intent of the user by analysing the text input ~ 303

Generate a query by correlating the determined intent of the user and contextual data ~ 305

Perform a unified search in a universal database associated with the object predicting system, based on the query ~ 307

Rank a plurality of multimodal objects predicted in response to the unified search, based on at least one of the contextual data and user preferences ~ 309

Provide at least one of the predicted plurality of multimodal objects related to the text input, to the user, based on the ranking ~ 311

FIG.3

METHOD AND SYSTEM FOR PROVIDING PERSONALIZED MULTIMODAL OBJECTS IN REAL TIME

CROSS-REFERENCE TO RELATED APPLICATIONS

This application is a continuation of International Application No. PCT/KR2020/003900 filed on Mar. 20, 2020, which claims priority to India Patent Application No. 201941010932 filed on Mar. 20, 2019 and India Patent Application No. 201941010932 filed on Mar. 17, 2020, the disclosures of which are herein incorporated by reference in their entirety.

BACKGROUND

1. Field

The present disclosure relates generally to the field of digital communication, and more specifically related to a method and a system for providing personalized multimodal objects in real-time.

2. Description of Related Art

Generally, digital conversations are aided by supporting objects such as Emojis, stickers, Graphics Interchange Format (GIF) and the like, which make the digital conversations engaging. These days each application used for performing digital conversations has a large number supporting objects, which may change or get updated frequently. Due to the presence of large number of supporting objects, detecting an appropriate supporting object related to the context of the digital conversation may extremely tedious, while the user is in the middle of a conversation. User may spend more time to detect the appropriate supporting object, which may not only slow down the conversation of the user, which in turn leads to loss of interest in the digital conversation. Moreover, to avoid such tedious and time consuming task of navigating through large number of supporting objects to select suitable supporting objects, the user may continue to use only a few frequently used supporting objects instead of exploring new supporting objects, which may be more suitable for the context.

Some of the existing techniques disclose a method for providing canned answers based on a message input of the user. These techniques may suggest one or more responses for a text message received by a user, which could be readily selected by the user to respond to the message. However, such techniques are limited to only providing appropriate response based on the context of the text message, but do not venture into prediction aspects of multimodal supporting objects.

Few other existing techniques disclose method for managing applications on a user device. These techniques provide suggestions of one or more secondary applications which are installed in the user device, based on the current application being used by the user and content of the current application. For example, the user receives a text message related to transferring money on an instant messaging application. The user device determines that the user may require an application related to transfer of money and identifies one or more secondary application related to a bank transaction, which are installed in the user device. These identified secondary applications are provided as suggestions to the user in the instant messaging application where the user received the message. However, even this technique is limited only to suggesting the appropriate application which may be usable by the user based on the content, but do not venture into prediction aspects of multimodal supporting objects.

Hence, there is a need for a technique for performing prediction of multimodal supporting objects.

In accordance with an aspect of the present disclosure, embodiments herein disclose a method of providing personalized multimodal objects in real-time. The method comprises receiving, by an object predicting system a text input from at least one application installed in a user device associated with a user. Further, the method includes determining an intent of the user by analyzing the text input. Upon determining the intent of the user, the method includes generating a query by correlating the determined intent of the user and contextual data. Subsequently, the method includes performing a unified search in a universal database associated with the object predicting system, based on the query. The universal database includes multimodal data related to ideographs, one or more applications configured in the user device, and one or more Internet of Things (IoT) devices connected to the user device. Upon performing the unified search, the method includes ranking a plurality of multimodal objects predicted in response to the unified search, based on at least one of the contextual data and user preferences. Finally, the method includes providing at least one of the predicted plurality of multimodal objects related to the text input, to the user, based on the ranking.

In various embodiments, the present disclosure discloses a method of generating a plurality of multimodal object predictions. The method includes determining a subject, an object and an action from a text input received from at least one application installed in a user device associated with a user. Further, the method includes determining a content provider for the action extracted from the text input, by mapping the action and a corresponding action verb of the text input with one or more content providers configured in a user device associated with the user. Subsequently, the method includes generating a query based on the determined content provider, the subject, the object and contextual data. Upon generating the query, the method includes performing a unified search in a universal database associated with the object predicting system, based on the query, wherein the universal database comprises multimodal data related to ideographs, one or more applications configured in the user device, one or more Internet of Things (IoT) devices and one or more Multiple Device Experience (MDE) devices connected to the user device. Finally, the method includes generating content related to the text input, from the content provider, as the multimodal prediction, based on the unified search.

In an embodiment, the present disclosure includes a method of generating a plurality of multimodal object predictions. The method includes determining one or more keywords from a text input received from a user, using one or more neural network techniques. Further, the method includes determining predefined number of emojis relevant to the one or more keywords from a predefined set of emojis. Subsequently, the method includes generating emoji vectors using metadata description associated with the determined predefined number of emojis, and word vectors using the one or more keywords. Upon generating the emoji vectors, the method includes ranking semantically similar keywords determined based on a cosine similarity between the emoji vectors and the word vectors. Further, the method includes determining a plurality of emojis associated with the semantically similar keywords using a Document Term Matrix (DTM). Thereafter, the method includes ranking the plurality of emojis based on user preferences. Finally, the method includes generating at least one of the plurality of emojis related to the text input, as the multimodal prediction, based on the ranking.

In an embodiment, the present disclosure includes a method of generating a plurality of multimodal object predictions. The method includes determining one or more keywords from a text input received from a user, using one or more neural network techniques. Further, the method includes determining predefined number of emojis relevant to the one or more keywords from a predefined set of emojis. Subsequently, the method includes receiving a first set of stickers corresponding to the determined predefined number of emojis, from a server, in response to the determined predefined number of emojis transmitted to the server. Further, the method includes generating sticker vectors using metadata description associated with a second set of stickers and word vectors using the one or more keywords. The second set of stickers comprises the first set of stickers received from the server and stickers relevant to the one or more keywords, stored in the user device. Upon generating the sticker vectors, the method includes ranking semantically similar keywords determined based on a cosine similarity between the sticker vectors and the word vectors. Thereafter, the method includes determining a plurality of stickers associated with the semantically similar keywords using a Document Term Matrix (DTM). Further, the method includes ranking the plurality of stickers based on user preferences. Finally, the method includes generating at least one of the plurality of stickers related to the text input, as the multimodal prediction, based on the ranking.

In an embodiment, the present disclosure includes a method of generating a plurality of multimodal object predictions. The method includes determining one or more keywords from a text input received from a user, using one or more neural network techniques. Further, the method includes determining predefined number of emojis relevant to the one or more keywords from a predefined set of emojis. Thereafter, the method includes receiving a first set of Graphics Interchange Format (GIFs) corresponding to the determined predefined number of emojis, from a server, in response to the determined predefined number of emojis transmitted to the server. Further, the method includes generating GIF vectors using metadata description associated with a second set of GIFs and word vectors using the one or more keywords. The second set of GIFs comprises the first set of GIFs received from the server and GIFs relevant to the one or more keywords, stored in the user device. Upon generating the GIF vectors, the method includes ranking semantically similar keywords determined based on a cosine similarity between the GIF vectors and the word vectors. Subsequently, the method includes determining a plurality of GIFs associated with the semantically similar keywords using a Document Term Matrix (DTM). Further, the method includes ranking the plurality of GIFs based on user preferences. Finally, the method includes generating at least one of the plurality of GIFs related to the text input, as the multimodal prediction, based on the ranking.

In an embodiment, the present disclosure includes a method of updating a Document Term Matrix (DTM). The method includes extracting, by an object predicting system, metadata description associated with at least one of a new sticker and a new Graphical Interchange Format (GIF). Further, the method includes determining a predefined number of emojis relevant to each of the one or more keywords identified from the metadata description. Upon determining the predefined number of emojis, the method includes extracting metadata description associated with each of the predefined number of emojis determined to be relevant to the one or more keywords. Subsequently, the method includes augmenting the metadata description associated with each of the predefined number of emojis with the metadata description associated with at least one of the new sticker and the new GIF. Finally, the method includes updating the DTM matrix with at least one of the new sticker and the new GIF, and the augmented metadata description associated with at least one of the corresponding new sticker and the corresponding new GIF.

In an embodiment, the present disclosure includes a method of updating a Document Term Matrix (DTM). The method includes extracting metadata description associated with at least one of a new sticker and a new Graphical Interchange Format (GIF). Further, the method includes determining a plurality of word embeddings associated with each of the one or more keywords identified in the metadata description. Thereafter, the method includes filtering the plurality of word embeddings based on an emotion associated with the one or more keywords and the corresponding plurality of words embeddings. Upon filtering the plurality of word embeddings, the method includes augmenting the filtered plurality of word embeddings with the metadata description associated with at least one of the new sticker and the new GIF. Finally, the method includes updating the DTM matrix with at least one of the new sticker and the new GIF, and the augmented metadata description associated with at least one of the corresponding new sticker and the corresponding new GIF.

In various embodiments, the present disclosure includes a method of generating a unified view of multimodal data. The method includes receiving a text input from a user through a user device. Upon receiving the text input, the method includes performing a unified search in a universal database associated with the object predicting system, based on the text input. The universal database comprises multimodal data related to ideographs, one or more applications configured in the user device, and one or more Internet of Things (IoT) devices connected to the user device. Finally, the method includes generating a unified view of the multimodal data related to the text input, retrieved by performing unified search.

In accordance with various embodiments of the present disclosure, embodiments herein disclose an object predicting system for providing personalized multimodal objects in real-time. The object predicting system comprises a processor and a memory communicatively coupled to the processor. The memory stores the processor-executable instructions, which, on execution, causes the processor to receive a text input from at least one application installed in a user device associated with a user. Further, the processor determines an intent of the user by analyzing the text input. Upon determining the intent of the user, the processor generates a query by correlating the determined intent of the user and contextual data. Subsequently, the processor performs a unified search in a universal database associated with the object predicting system, based on the query. The universal database includes multimodal data related to ideographs, one or more applications configured in the user device, and one or more Internet of Things (IoT) devices connected to the user device. Upon performing the unified search, the processor ranks a plurality of multimodal objects predicted in response to the unified search, based on at least one of the contextual data and user preferences. Finally, the processor provides at least one of the predicted plurality of multimodal objects related to the text input, to the user, based on the ranking.

In an embodiment, the present disclosure includes an object predicting system for generating a plurality of multimodal object predictions. The object predicting system comprises a processor and a memory communicatively coupled to the processor. The memory stores the processor-executable instructions, which, on execution, causes the processor to determine a subject, an object and an action from a text input received from at least one application installed in a user device associated with a user. Further, the processor determines a content provider for the action extracted from the text input, by mapping the action and a corresponding action verb of the text input with one or more content providers configured in a user device associated with the user. Subsequently, the processor generates a query based on the determined content provider, the subject, the object and contextual data. Upon generating the query, the processor performs a unified search in a universal database associated with the object predicting system, based on the query. The universal database comprises multimodal data related to ideographs, one or more applications configured in the user device, one or more Internet of Things (IoT) devices and one or more Multiple Device Experience (MDE) devices connected to the user device. Finally, the processor generates content related to the text input, from the content provider, as the multimodal prediction, based on the unified search.

In an embodiment, the present disclosure includes an object predicting system for generating a plurality of multimodal object predictions. The object predicting system comprises a processor and a memory communicatively coupled to the processor. The memory stores the processor-executable instructions, which, on execution, causes the processor to determine one or more keywords from a text input received from a user, using one or more neural network techniques. Further, the processor determines predefined number of emojis relevant to the one or more keywords from a predefined set of emojis. Subsequently, the processor generates emoji vectors using metadata description associated with the determined predefined number of emojis, and word vectors using the one or more keywords. Upon generating the emoji vectors, the processor ranks semantically similar keywords determined based on a cosine similarity between the emoji vectors and the word vectors. Further, the processor determines a plurality of emojis associated with the semantically similar keywords using a Document Term Matrix (DTM). Thereafter, the processor ranks the plurality of emojis based on user preferences. Finally, the processor generates at least one of the plurality of emojis related to the text input, as the multimodal prediction, based on the ranking.

In an embodiment, the present disclosure includes an object predicting system for generating a plurality of multimodal object predictions. The object predicting system comprises a processor and a memory communicatively coupled to the processor. The memory stores the processor-executable instructions, which, on execution, causes the processor to determine one or more keywords from a text input received from a user, using one or more neural network techniques. Further, the processor determines predefined number of emojis relevant to the one or more keywords from a predefined set of emojis. Subsequently, the processor receives a first set of stickers corresponding to the determined predefined number of emojis, from a server, in response to the determined predefined number of emojis transmitted to the server. Further, the processor generates sticker vectors using metadata description associated with a second set of stickers and word vectors using the one or more keywords. The second set of stickers comprises the first set of stickers received from the server and stickers relevant to the one or more keywords, stored in the user device. Upon generating the sticker vectors, the processor ranks semantically similar keywords determined based on a cosine similarity between the sticker vectors and the word vectors. Thereafter, the processor determines a plurality of stickers associated with the semantically similar keywords using a Document Term Matrix (DTM). Further, the processor ranks the plurality of stickers based on user preferences. Finally, the processor generates at least one of the plurality of stickers related to the text input, as the multimodal prediction, based on the ranking.

In an embodiment, the present disclosure includes an object predicting system for generating a plurality of multimodal object predictions. The object predicting system comprises a processor and a memory communicatively coupled to the processor. The memory stores the processor-executable instructions, which, on execution, causes the processor to determine one or more keywords from a text input received from a user, using one or more neural network techniques. Further, the processor determines predefined number of emojis relevant to the one or more keywords from a predefined set of emojis. Thereafter, the processor receives a first set of Graphics Interchange Format (GIFs) corresponding to the determined predefined number of emojis, from a server, in response to the determined predefined number of emojis transmitted to the server. Further, the processor generates GIF vectors using metadata description associated with a second set of GIFs and word vectors using the one or more keywords. The second set of GIFs comprises the first set of GIFs received from the server and GIFs relevant to the one or more keywords, stored in the user device. Upon generating the GIF vectors, the processor ranks semantically similar keywords determined based on a cosine similarity between the GIF vectors and the word vectors. Subsequently, the processor determines a plurality of GIFs associated with the semantically similar keywords using a Document Term Matrix (DTM). Further, the processor ranks the plurality of GIFs based on user preferences. Finally, the processor generates at least one of the plurality of GIFs related to the text input, as the multimodal prediction, based on the ranking.

In an embodiment, the present disclosure includes an object predicting system for updating a Document Term Matrix (DTM). The object predicting system comprises a processor and a memory communicatively coupled to the processor. The memory stores the processor-executable instructions, which, on execution, causes the processor to extract metadata description associated with at least one of a new sticker and a new Graphical Interchange Format (GIF). Further, the processor determines a predefined number of emojis relevant to each of the one or more keywords identified from the metadata description. Upon determining the predefined number of emojis, the processor extracts metadata description associated with each of the predefined number of emojis determined to be relevant to the one or more keywords. Subsequently, the processor augments the metadata description associated with each of the predefined number of emojis with the metadata description associated with at least one of the new sticker and the new GIF. Finally, the processor updates the DTM matrix with at least one of the new sticker and the new GIF, and the augmented metadata description associated with at least one of the corresponding new sticker and the corresponding new GIF.

In an embodiment, the present disclosure includes an object predicting system for updating a Document Term Matrix (DTM). The object predicting system comprises a processor and a memory communicatively coupled to the processor. The memory stores the processor-executable instructions, which, on execution, causes the processor to extract metadata description associated with at least one of a new sticker and a new Graphical Interchange Format (GIF). Further, the processor determines a plurality of word embeddings associated with each of the one or more keywords identified in the metadata description. Thereafter, the processor filters the plurality of word embeddings based on an emotion associated with the one or more keywords and the corresponding plurality of words embeddings. Upon filtering the plurality of word embeddings, the processor augments the filtered plurality of word embeddings with the metadata description associated with at least one of the new sticker and the new GIF. Finally, the processor updates the DTM matrix with at least one of the new sticker and the new GIF, and the augmented metadata description associated with at least one of the corresponding new sticker and the corresponding new GIF.

In an embodiment, the present disclosure includes an object predicting system for generating a unified view of multimodal data. The object predicting system comprises a processor and a memory communicatively coupled to the processor. The memory stores the processor-executable instructions, which, on execution, causes the processor to receive a text input from a user through a user device. Upon receiving the text input, the processor performs a unified search in a universal database associated with the object predicting system, based on the text input. The universal database comprises multimodal data related to ideographs, one or more applications configured in the user device, and one or more Internet of Things (IoT) devices connected to the user device. Finally, the processor generates a unified view of the multimodal data related to the text input, retrieved by performing unified search.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIGS. 2B, 2C, 2D, and 2E show flowcharts, each illustrating a method of generating a plurality of multimodal object predictions, in accordance with various embodiments of the present disclosure;

FIGS. 2F, and 2G show flowcharts, each illustrating a method of updating a Document Term Matrix (DTM), in accordance with various embodiments of the present disclosure;

FIG. 3 shows a flowchart illustrating a method of providing personalized multimodal objects in real-time, in accordance with various embodiments of the present disclosure;

Figure 1A:
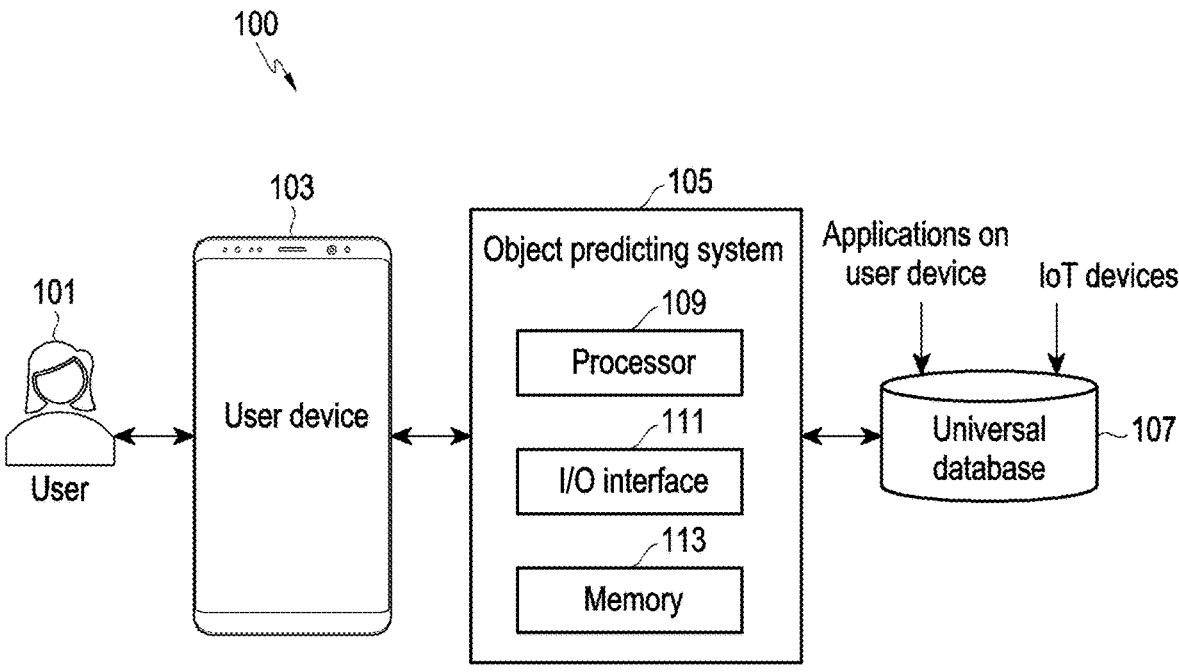
FIG. 1A shows an exemplary architecture for providing personalized multimodal objects in real-time in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for providing personalized multimodal objects in real-time. An object predicting system may receive a text input from at least one application installed in a user device associated with a user. In some embodiments, upon receiving the text input, the object predicting system may determine an intent of the user by analyzing the text input. Thereafter, the object predicting system may generate a query by correlating the determined intent of the user and contextual data. Subsequently, the object predicting system may perform a unified search in a universal database associated with the object predicting system, based on the query. The universal database may include, but not limited to, multimodal data related to ideographs, one or more applications configured in the user device, and one or more Internet of Things (IoT) devices connected to the user device. Upon performing the unified search, the object predicting system may rank a plurality of multimodal objects predicted in response to the unified search, based on at least one of the contextual data and user preferences. Thereafter, the object predicting system may provide at least one of the predicted plurality of multimodal objects related to the text input, to the user, based on the ranking.

The present disclosure covers a complete spectrum i.e., the present disclosure provides intelligent multimodal object suggestions related to ideographs, content, services, IoT, Multiple Device Experience (MDE), providers and the like. Therefore, the present disclosure is a one-stop solution for predictions and suggestions related to the complete spectrum of multimodal data. Further, the present disclosure prioritizes the multimodal object predictions based on the contextual data and user preferences, which ensures providing the most relevant multimodal object predictions to the user. Moreover, the present disclosure provides the intelligence to understand, which factors to be considered for prioritizing based on the scenarios. As an example, when the context is related to "watching", the object predicting system may prioritize the content related object predictions rather than the ideographic or textual object predictions. Furthermore, the present disclosure enables performing personalization at multiple levels. In some embodiments, the object predicting system may rank the multimodal object predictions based on the user preferences or based on past actions of the user, which prioritize and personalize the multimodal object predictions for the user. In some embodiments, the object predicting system may personalize the multimodal object predictions for the user based on the feedback received from the user. User's preferences may change from time to time based on scenarios and context. Therefore, personalization based on the feedback received from the user personalizes the multimodal object predictions in accordance with the current preferences of the user. In some embodiments, the object predicting system may rank the ideographs selected from the Document Term Matrix (DTM) based on the user preferences, which not only provides the ideographs that are relevant to the text input, but also that are relevant to the preferences of the user. Further, the present disclosure enables performing a unified search in a universal database that comprises multimodal data and also provides the unified view of the results such that, the user can find any kind of data at a single place in the user device.

A description of an embodiment with several components in communication with each other does not imply that all such components are required. On the contrary, a variety of optional components are described to illustrate the wide variety of possible embodiments of the invention.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A shows an exemplary architecture for providing personalized multimodal objects in real-time, in accordance with some embodiments of the present disclosure.

The architecture 100 includes a user 101, a user device 103, an object predicting system 105 and a universal database 107. In some embodiments, the user device 103 may be operated by the user 101. The user device 103 may be associated with the object predicting system 105. In some embodiments, the object predicting system 105 may be configured within the user device 103. In some embodiments, the user device 103 may include, but not limited to, a mobile phone, a laptop, a tablet, a desktop, a smartwatch and the like. In some embodiments, the object predicting system 105 may be associated with the user device 103 via a communication network (not shown in the FIG. 1A). The communication network may be at least one of a wired communication network and a wireless communication network.

The object predicting system 105 may include a processor 109, an I/O interface 111 and a memory 113. The I/O interface 111 may be configured to receive a text input from at least one application installed in the user device 103 associated with the user 101. The text input may be provided by the user 101 through the at least one application installed in the user device 103. In some embodiments, the processor 109 may determine intent of the user 101 by analyzing the text input. As an example, the intent of the user 101 may indicate what kind of a multimodal object the user 101 wishes to use at that point of time. In some embodiments, the processor 109 may determine the intent of the user 101 using at least one of, one or more first Deep Neural Networks (DNN) techniques and one or more Long short-term memory (LSTM) techniques. Upon determining the intent of the user 101, the processor 109 may generate a query by correlating the determined intent of the user 101 and contextual data. In some embodiments, the contextual data may include pre-stored data and real-time data. As an example, the contextual data may include, but not limited to, features of the user device 103, time and location of the user device 103, name and metadata related to one or more applications accessed by the user 101, actions of the user 101 in the one or more applications, user state, device state, and historical data related to corresponding past actions of the user 101.

Based on the generated query, the processor 109 may perform a unified search in the universal database 107 associated with the object predicting system 105. In some embodiments, the universal database 107 may include, but not limited to, multimodal data related to ideographs, one or more applications configured in the user device 103, and one or more Internet of Things (IoT) devices connected to the user device 103. Thereafter, the processor 109 may rank the plurality of multimodal objects predicted in response to the unified search, based on at least one of the contextual data and user preferences. In some embodiments, the plurality of multimodal object predictions i.e. the plurality of multimodal objects predicted in response to the unified search, may be ranked using, but not limited to, rule based techniques and one or more second Deep Neural Network (DNN) techniques. The plurality of multimodal predictions may be related to at least one of ideographs, image content, video content, audio content, documents, vouchers, text content, stored contacts of the user 101 and the like. In some embodiments, the ideographs may be predicted using one or more third DNN techniques and a Document Term Matrix (DTM) stored in the universal database 107. As an example, the ideographs may include, but not limited to, emojis, stickers and Graphics Interchange Formats (GIFs). Finally, the processor 109 may provide at least one of the predicted plurality of multimodal objects related to the text input, to the user 101, based on the ranking.

Figures 1B, 1C:
FIGS. 1B, 1C, 1D, 1E, 1F, and 1G illustrate different use cases of the present disclosure in accordance with various embodiments of the present disclosure.

In some embodiments, the present disclosure may be used for providing multimodal objects such as ideographic suggestions, that may include emojis, GIFs, stickers, Augmented Reality (AR) emojis, combination of emojis and the like, as shown in the FIG. 1B.

In some embodiments, the present disclosure may be used for providing multimodal objects such as content suggestions, that may include displaying coupons, One Time Password (OTP) and the like, which may be related to the context of the text input, as shown in the FIG. 1C.

Figure 1D:
Figure 1E:
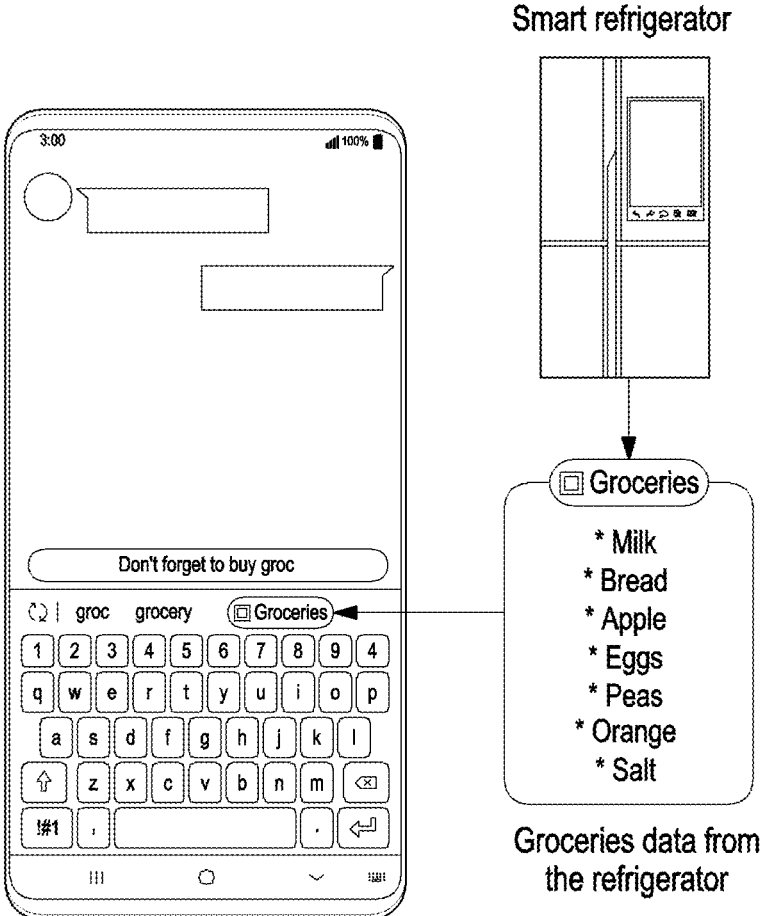

In some embodiments, the present disclosure may be used for providing multimodal data such as provider suggestions, that may include identifying content on the user device 103 which may be a file such as Aadhar card, a contact name, an application and the like, as shown in the FIG. 1D. In some embodiments, the processor 109 may identify the content from the one or more IoT devices that are associated with the user device 103. As an example, the provider suggestion such as grocery list from a smart refrigerator may be provided to the user 101 as shown in the FIG. 1E.

Figure 1F:
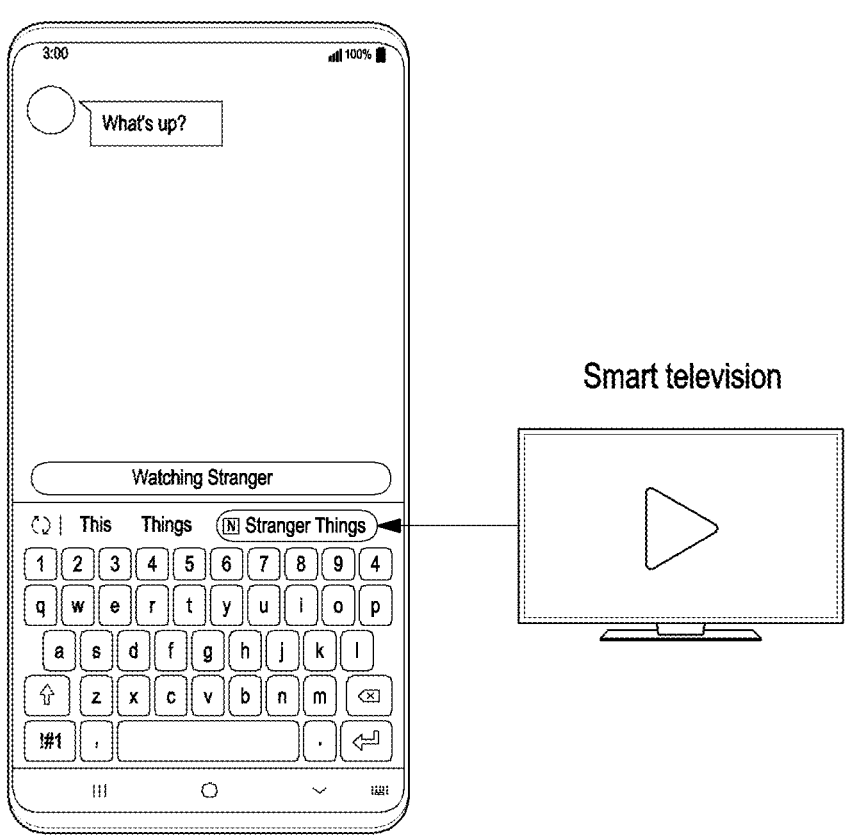

In some embodiments, the present disclosure may be used for providing multimedia content such as a video content, an audio content, a link to a video or an audio content, as shown in the FIG. 1F. In some embodiments, a receiver device can act on the received content, for example, play the received content in a connected device such as a television, through a received message.

Figure 1G:
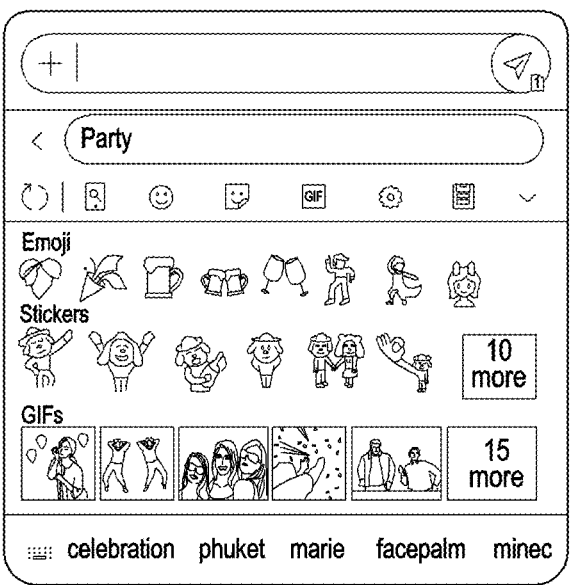

In some embodiments, the present disclosure may be used for performing unified search and providing a unified view of the multimodal objects as shown in the FIG. 1G.

In some embodiments, the present disclosure may be used for achieving intelligence by categories i.e. the present disclosure may enable the user to individually search for more options within given categories of multimodal data.

Figure 2A:
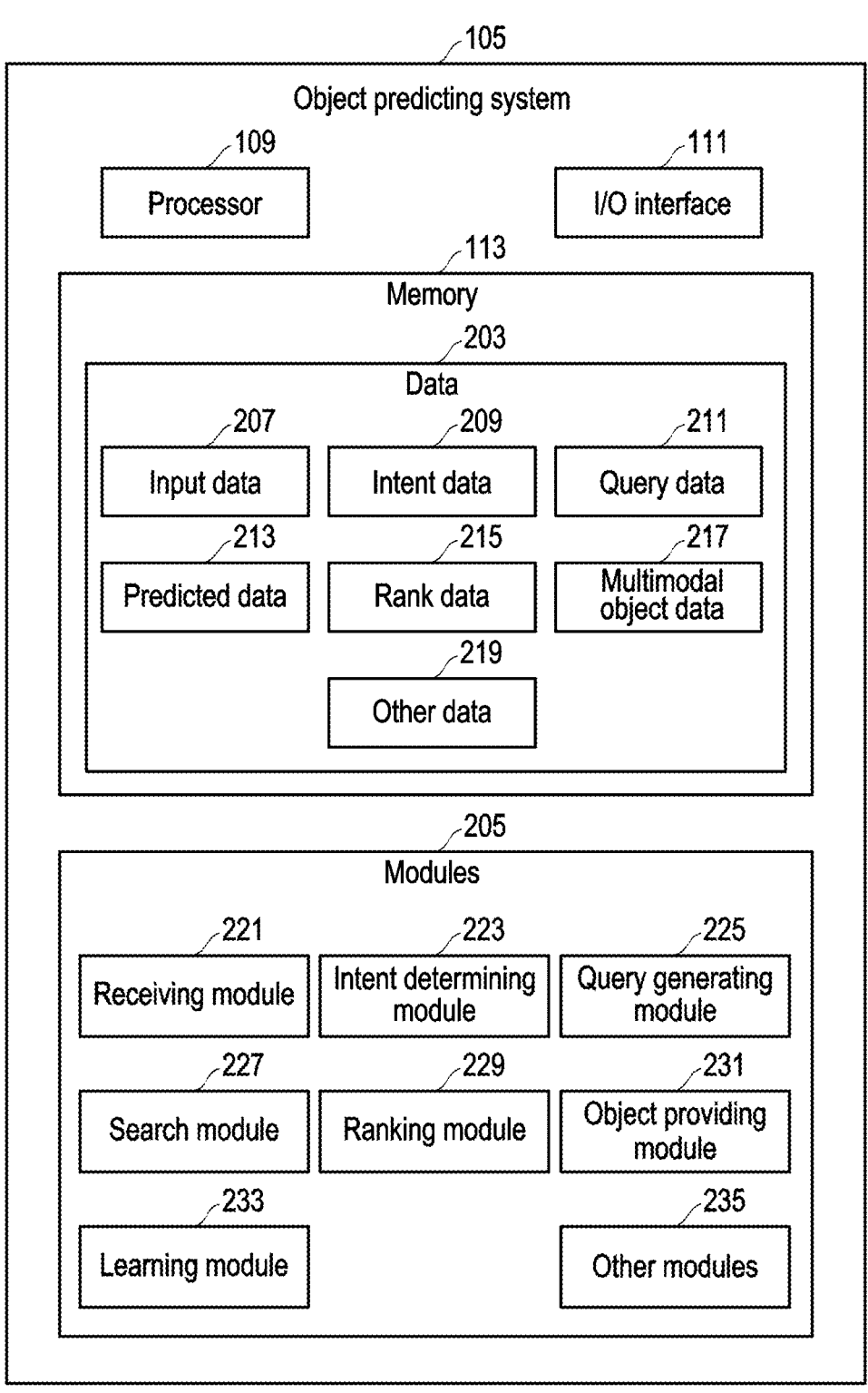
FIG. 2A shows a detailed block diagram of an object predicting system for providing personalized multimodal objects in real-time, in accordance with various embodiments of the present disclosure.

FIG. 2A shows a detailed block diagram of an object predicting system for providing personalized multimodal objects in real-time, in accordance with some embodiments of the present disclosure.

In some implementations, the object predicting system 105 may include data 203 and modules 205. As an example, the data 203 is stored in the memory 113 configured in the object predicting system 105 as shown in the FIG. 2A. In one embodiment, the data 203 may include input data 207, intent data 209, query data 211, predicted data 213, rank data 215, multimodal object data 217 and other data 219. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 219 may store data, including temporary data and temporary files, generated by the modules 205 for performing the various functions of the object predicting system 105.

In some embodiments, the data 203 stored in the memory 113 may be processed by the modules 205 of the object predicting system 105. The modules 205 may be stored within the memory 113. In an example, the modules 205 communicatively coupled to the processor 109 configured in the object predicting system 105, may also be present outside the memory 113 as shown in FIG. 2A and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 221, an intent determining module 223, a query generating module 225, a search module 227, a ranking module 229, an object providing module 231, learning module 233 and other modules 235. The other modules 235 may be used to perform various miscellaneous functionalities of the object predicting system 105. It will be appreciated that such aforementioned modules 205 may be represented as a single module or a combination of different modules.

In some embodiments, the receiving module 221 may receive a text input from at least one application installed in a user device 103 associated with a user 101. As an example, the text input may be a word, a phrase, a partial sentence, a complete sentence, a number and the like. In some embodiments, the receiving module 221 may receive the text input from application such as a messaging application, a social networking application such as Facebook®, Instagram® and the like. The text input received from the user device 103 may be stored as the input data 207.

In some embodiments, the intent determining module 223 may determine an intent of the user 101 by analyzing the text input. The intent determining module 223 may determine the intent of the user 101 using techniques which may include, but not limited to, one or more first Deep Neural Networks (DNN) techniques and one or more Long short-term memory (LSTM) techniques. In some embodiments, the intent of the user 101 may indicate what kind of a multimodal object the user 101 can use at that point of time. As an example, the multimodal objects may be at least one of ideographs such as Emojis, stickers, Graphics Interchange Formats (GIFs), contacts, multimedia links, location, documents, applications, coupons, data fetched from IoT devices and the like. In some embodiments, the intent of the user 101 may be determined based on date and time and Parts of Speech (PoS) of the text input. The date and time may be either explicit or relative. As an example, the date may be explicit such as "3rd September" or relative such as "day after tomorrow". Similarly, the time may be explicit such as "3:00 PM" or relative such as "noon time". As an example, the PoS may be noun, proper noun, verbs, adjectives and the like, which help in deriving meaningful information from the text input. The intent of the user 101 thus determined may be stored as the intent data 209.

In some embodiments, the query generating module 225 may generate a query by correlating the determined intent of the user 101 and contextual data. As an example, the contextual data may include, but not limited to, features of the user device 103, time and location of the user device 103, name and metadata related to one or more applications accessed by the user 101, actions of the user 101 in the one or more applications, user state, device state, and historical data related to corresponding past actions of the user 101. In some embodiments, the contextual data may be pre-stored data. In some other embodiments, the contextual data may be real-time data. As an example, a query generated based on the intent of the user 101 and the contextual data may be as shown below:
Select * from mediadb
Where content_name="XYZ"

And content_provider="*AB*"

and time="today"

The query thus generated may be stored as the query data 211.

In some embodiments, the search module 227 may perform a unified search in a universal database 107 associated with the object predicting system 105. The search module 227 may perform the unified search in the universal database 107 based on the generated query. In some embodiments, the universal database 107 may include, but not limited to, multimodal data related to ideographs, one or more applications configured in the user device 103, and one or more Internet of Things (IoT) devices connected to the user device 103. As an example, the ideographs may include, but not limited to, Emojis, stickers and GIFs. In some embodiments, based on the unified search, the search module 227 may predict a plurality of multimodal objects that are relevant to the generated query. The plurality of multimodal object predictions may be stored as the predicted data 213. As an example, the plurality of multimodal object predictions may be related to ideographs, image content, video content, audio content, documents, vouchers, text content and stored contacts of the user 101. Therefore, the plurality of multimodal objects may be predicted using different means based on the type of multimodal object. In some embodiments, the plurality of multimodal objects may be predicted using one or more third DNN techniques and a Document Term Matrix (DTM). In some embodiments, the DTM may include, but not limited to, the ideographs and mapping of the ideographs with corresponding metadata description.

As an example, when the multimodal object to be predicted is related to a content such as an image content, video content, audio content and the like, the search module 227 may perform the method as illustrated in the flowchart FIG. 2B. At block 241, the search module 227 may determine a subject, an object and an action from the text input received from the at least one application installed in the user device 103. In some embodiments, the search module 227 may determine the subject, the object and the action based on the date and time, and the PoS tagged with each of one or more words present in the text input.

As an example, consider the text input is "I am watching friends on Net . . . ". Each of the one or more words in the text input may be tagged with a corresponding PoS using one or more Long Short-Term Memory (LSTM) techniques known to the person skilled in the art. As an example, one of the LSTM techniques may be a BiLSTM technique. As an example, the PoS tagged with each of the one or more words is as shown below:

I—PRP

Am—VBP

Watching—VBG

Friends—NNS

On—IN

Net—NNP

In the above PoS tagging,

PRP indicates Personal Pronoun

VBG Verb, gerund or present participle

VBP Verb, non-third person singular present

IN Preposition or subordinating conjunction

NNS Noun, plural

NNP Proper noun, singular

Based on the above PoS tags associated with each of the one or more words in the text input, the search module 227 may determine the subject, the object and the action from the text input, by performing sentence pattern and affinity analysis. In the above example, the subject in the text input is Friends®, the object in the text input is user referred by "I", and the action in the text input is "watching".

At block 242, the search module 227 may determine a content provider for the action extracted from the text input. In some embodiments, the search module 227 may determine the content provider by mapping the determined action and a corresponding action verb of the text input with one or more content providers configured in the user device 103 associated with the user 101. Further, the search module 227 may also map the determined subject and object with the subject and object corresponding to the one or more content providers, to determine the apt content provider. As an example, consider the search module 227 may determine the one or more content providers as Netflix®, BeeLine™ TV and the like. However, since the text input includes a word "Net.." which is incomplete, the search module 227 may determine that the content provider which matches the word "Net . . . " is "Netflix®".

At block 243, the search module 227 may generate a query based on the determined content provider, the subject, the object and contextual data. In some embodiments, the contextual data in the current context may be "date and time" and "location of the user" As an example, the "date and time" derived from the text input is relative i.e. "today" and the "location of the user" is determined to be "home". In some embodiments, the search module 227 may generate the query the determined content provider, the subject, the object and contextual data as shown below:

Select * from mediadb

Where content_name="Friends®"

And content_provider="*net*"

and time="today"

At block 244, the search module 227 may perform the unified search in the universal database 107, based on the generated query.

At block 245, the search module 227 may detect content related to the text input from the content provider, as the multimodal prediction, based on the unified search. In the above example, the search module 227 may detect an episode of content "Friends®" and exact instant of the episode which is currently being watched by the user 101 from the content provider "Netflix®" as the multimodal prediction. In some embodiments, along with the content, the search module 227 may also provide other multimodal object predictions such as Emojis or stickers which may be related to watching movies, the word "Netflix®" which was incomplete in the text input and the like. An exemplary view of the multimodal object predictions, with respect to the above example, is as shown below:

1. Netflix®

Figure 5A:
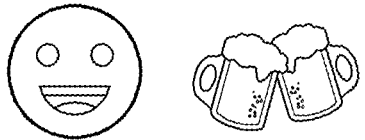
FIGS. 5A and 5B show exemplary multimodal object predictions in accordance with various embodiments of the present disclosure.

2. Emojis or stickers shown in FIG. 5A

Figure 5B:
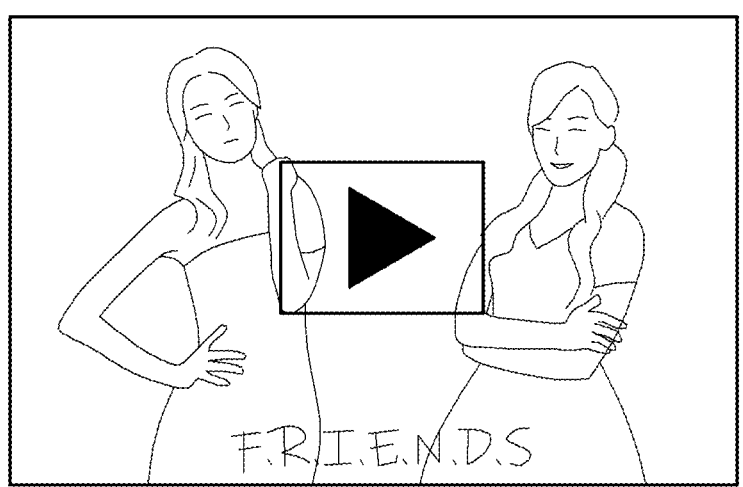

3. Video of episode of Friends® shown in FIG. 5B

Further, when the multimodal object to be predicted is related to an ideograph such as an Emoji, the search module 227 may perform the method as illustrated in the flowchart FIG. 2C. Initially, the search module 227 may determine if the text input received from the user 101 is a direct text input i.e. if the text input received from the user 101 is complete. When the text input received from the user 101 is not a direct text input, the search module 227 may perform at least one of completion or a further prediction. In some embodiments, the text input may require completion, when the text input is in a composite state and has the possibility of being completed by many different words. As an example, if the user 101 types a text input such as "Win" and does not provide a space, the search module 227 understands that, the text input is in a composite state and needs to be completed.

Therefore, the search module 227 may generate possible completion or correction words which would relate to the context such as "Wine", "Winner", "Wink" and the like. In some embodiments, the text input may require further prediction, when the text input ends with a space. As an example, if the user 101 types a text input "Win" followed by a space, then the search module 227 understands that, the text input requires further prediction, such as Emojis related to the text input need to be predicted.

Upon analyzing the text input as explained in the above paragraph, at block 251, the search module 227 may determine one or more keywords from the text input received from the user 101, using one or more neural network techniques. As an example, the one or more neural network techniques may be LSTM techniques known to the person skilled in the art.

At block 252, the search module 227 may determine predefined number of emojis relevant to the one or more keywords from a predefined set of emojis. In some embodiments, as part of the LSTM technique, the search module 227 may subject the one or more keywords to skip connections and thereafter an attention layer to calculate weighted average, based on which the search module 227 generates emoji predictions. Thereafter, the search module 227 may use a model such as a skip gram model to determine personalized emojis relevant to the text input, that are personalized according to user preferences. In some embodiments, the search module 227 may determine the predefined number of emojis relevant to the one or more keywords from the predefined set of emojis, by combining the emoji predictions generated based on the LSTM technique and the personalized emojis. As an example, the determined predefined number of emojis may also be referred as the top "k" emojis that are a combination of generic emojis relevant to the text input, and personalized emojis relevant to the text input and user preference.

At block 253, the search module 227 may generate emoji vectors using metadata description associated with the determined predefined number of emojis and word vectors using the one or more keywords. In some embodiments, the emoji vectors may be generated based on predefined emoji embeddings and the word vectors may be generated based on the predefined word embeddings stored in the universal database 107. In some other embodiments, the emoji vectors and the word vectors may be generated based on word-to-vector model.

At block 255, the search module 227 may rank semantically similar keywords determined based on a cosine similarity between the emoji vectors and the word vectors.

At block 256, the search module 227 may determine a plurality of emojis associated with the semantically similar keywords using a Document Term Matrix (DTM). In some embodiments, the DTM may include the ideographs and mapping of the ideographs with corresponding metadata description.

At block 257, the search module 227 may rank the plurality of emojis associated with the semantically similar keywords, based on the user preferences.

At block 258, the search module 227 may generate at least one of the plurality of emojis related to the text input, as the multimodal prediction, based on the ranking.

Further, when the multimodal object to be predicted is related to an ideograph such as a sticker, the search module 227 may perform the method as illustrated in the flowchart FIG. 2D. Initially, the search module 227 may determine if the text input received from the user 101 is a direct text input i.e., if the text input received from the user 101 is complete.

When the text input received from the user 101 is not a direct text input, the search module 227 may perform at least one of completion or a further prediction. In some embodiments, the text input may require completion, when the text input is in a composite state and has the possibility of being completed by many different words. In some embodiments, the text input may require further prediction, when the text input ends with a space.

Upon analyzing the text input as explained in the above paragraph, at block 261, the search module 227 may determine one or more keywords from the text input received from the user 101, using one or more neural network techniques. As an example, the one or more neural network techniques may be LSTM techniques known to the person skilled in the art.

At block 262, the search module 227 may determine predefined number of emojis relevant to the one or more keywords from a predefined set of emojis. In some embodiments, as part of the LSTM technique, the search module 227 may subject the one or more keywords to skip connections and thereafter an attention layer to calculate weighted average, based on which the search module 227 generates emoji predictions. Thereafter, the search module 227 may use a model such as a skip gram model to determine personalized emojis relevant to the text input, that are personalized according to user preferences. In some embodiments, the search module 227 may determine the predefined number of emojis relevant to the one or more keywords from the predefined set of emojis, by combining the emoji predictions generated based on the LSTM technique and the personalized emojis. As an example, the determined predefined number of emojis may also be referred as the top "k" emojis that are a combination of generic emojis relevant to the text input, and personalized emojis relevant to the text input and user preference.

At block 263, the search module 227 may receive a first set of stickers corresponding to the determined predefined number of emojis, from a server. In some embodiments, the search module 227 may transmit the determined predefined number of emojis i.e., the top "k" emojis to the server associated with the object predicting system 105. In response to the determined predefined number of emojis transmitted to the server, the search module 227 may receive the first set of stickers corresponding to the determined predefined number of emojis.

At block 264, the search module 227 may generate sticker vectors using metadata description associated with a second set of stickers, and word vectors using the one or more keywords. In some embodiments, the second set of stickers may include the first set of stickers received from the server and stickers relevant to the one or more keywords, stored in the user device 103. In some embodiments, all the stickers may not be stored in the user device 103 due to memory constraint. Therefore, the search module 227 may fetch relevant stickers from the server and also from the user device 103. In some embodiments, the sticker vectors may be generated based on predefined sticker embeddings and the word vectors may be generated based on the predefined word embeddings stored in the universal database 107. In some other embodiments, the sticker vectors and the word vectors may be generated based on word2vec model.

At block 265, the search module 227 may rank semantically similar keywords determined based on a cosine similarity between the sticker vectors and the word vectors.

At block 266, the search module 227 may determine a plurality of stickers associated with the semantically similar keywords using the DTM.

At block 267, the search module 227 may rank the plurality of stickers associated with the semantically similar keywords, based on the user preferences.

At block 268, the search module 227 may generate at least one the plurality of stickers related to the text input, as the multimodal prediction, based on the ranking.

Further, when the multimodal object to be predicted is related to an ideograph such as a GIF, the search module 227 may perform the method as illustrated in the flowchart FIG. 2E. Initially, the search module 227 may determine if the text input received from the user 101 is a direct text input i.e. if the text input received from the user 101 is complete. When the text input received from the user 101 is not a direct text input, the search module 227 may perform at least one of completion or a further prediction. In some embodiments, the text input may require completion, when the text input is in a composite state and has the possibility of being completed by many different words. In some embodiments, the text input may require further prediction, when the text input ends with a space.

Upon analyzing the text input as explained in the above paragraph, at block 271, the search module 227 may determine one or more keywords from the text input received from the user 101, using one or more neural network techniques. As an example, the one or more neural network techniques may be LSTM techniques known to the person skilled in the art.

At block 272, the search module 227 may determine predefined number of emojis relevant to the one or more keywords from a predefined set of emojis. In some embodiments, as part of the LSTM technique, the search module 227 may subject the one or more keywords to skip connections and thereafter an attention layer to calculate weighted average, based on which the search module 227 generates emoji predictions. Thereafter, the search module 227 may use a model such as a skip gram model to determine personalized emojis relevant to the text input, that are personalized according to user preferences. In some embodiments, the search module 227 may determine the predefined number of emojis relevant to the one or more keywords from the predefined set of emojis, by combining the emoji predictions generated based on the LSTM technique and the personalized emojis. As an example, the determined predefined number of emojis may also be referred as the top "k" emojis that are a combination of generic emojis relevant to the text input, and personalized emojis relevant to the text input and user preference.

At block 273, the search module 227 may receive a first set of GIFs corresponding to the determined predefined number of emojis, from a server. In some embodiments, the search module 227 may transmit the determined predefined number of emojis i.e., the top "k" emojis to the server associated with the object predicting system 105. In response to the determined predefined number of emojis transmitted to the server, the search module 227 may receive the first set of GIFs corresponding to the determined predefined number of emojis.

At block 274, the search module 227 may generate GIF vectors using metadata description associated with a second set of GIFs, and word vectors using the one or more keywords. In some embodiments, the second set of GIFs may include the first set of GIFs received from the server and GIFs relevant to the one or more keywords, stored in the user device 103. In some embodiments, all the GIFs may not be stored in the user device 103 due to memory constraint. Therefore, the search module 227 may fetch relevant GIFs from the server and also from the user device 103. In some embodiments, the GIF vectors may be generated based on predefined GIF embeddings and the word vectors may be generated based on the predefined word embeddings stored in the universal database 107. In some other embodiments, the GIF vectors and the word vectors may be generated based on word2vec model.

At block 275, the search module 227 may rank semantically similar keywords determined based on a cosine similarity between the GIF vectors and the word vectors.

At block 276, the search module 227 may determine a plurality of GIFs associated with the semantically similar keywords using the DTM.

At block 277, the search module 227 may rank the plurality of GIFs associated with the semantically similar keywords, based on the user preferences.

At block 278, the search module 227 may generate at least one the plurality of GIFs related to the text input, as the multimodal prediction, based on the ranking.

Further, upon performing the unified search based on the query, the ranking module 229 may rank the plurality of multimodal objects predicted in response to the unified search, based on at least one of the contextual data and user preferences. In the example of the text input "I am watching friends on Net . . . " explained above, the plurality of multimodal predictions that are predicted are as shown below:

1. Netflix
2. Emojis or stickers shown in FIG. 5A
3. Video of episode of Friends® shown in FIG. 5B

Figure 2H:
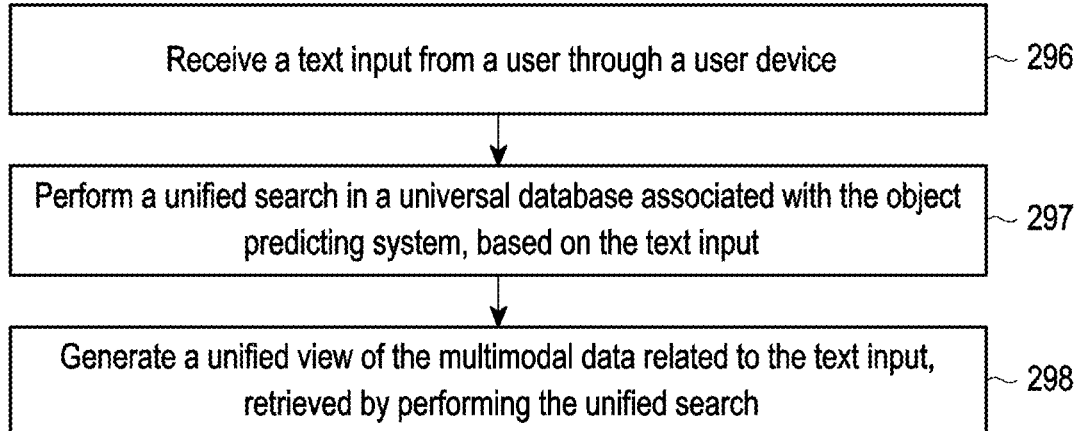
FIG. 2H shows a flowchart illustrating a method of generating a unified view of multimodal data, in accordance with various embodiments of the present disclosure.

As an example, consider that the ranking module 229 infers based on the historical data corresponding to past actions of the user 101, which is part of the contextual data, that, in the past when such a message was sent by the user 101, the user 101 had preferred to share the content. Therefore, based on the contextual data and the user preferences, the ranking module 229 may rank the plurality of multimodal predictions as shown below:

1. Video of episode of Friends® shown in FIG. 5B
2. Netflix
3. Emojis or stickers shown in FIG. 5A

Based on the above ranking, the content which the user 101 is watching is given the first rank, while the name of the content provider is given the second rank and the emojis relevant to the action "watching" is given the third rank. In some embodiments, the plurality of multimodal object predictions is ranked using, but not limited to, rule-based techniques and one or more second Deep Neural Network (DNN) techniques. The plurality of multimodal predictions that are ranked, may be stored as the rank data 215.

Further, the object providing module 231 may provide at least one of the predicted plurality of multimodal objects related to the text input, to the user 101, based on the ranking. In some embodiments, the object providing module 231 may provide only one multimodal object to the user 101 which is the most relevant multimodal object for the text input. As an example, the most relevant multimodal object may be the object associated with the first rank among the plurality of multimodal objects. Therefore, based on the above ranking example, the object "content" i.e. the video of episode of "Friends®" is associated with the first rank. Therefore, the object providing module 231 may provide the "content" as the multimodal object to the user 101. In some embodiments, plurality of multimodal objects may be provided to the user 101. In such scenarios, the object providing module 231 may provide each of the plurality of multimodal objects that are ranked, in the order of their ranking, or may provide few of the multimodal objects that are ranked, in the order of their ranking. The multimodal object thus provided to the user 101 may be stored as the multimodal object data 217.

Further, the learning module 233 may initiate a self-learning process based on at least one of, selection/rejection of the predicted plurality of multimodal objects by the user 101, feedback of the user 101 for the predicted plurality of multimodal objects, and indication of user preferences by the user 101. In some embodiments, the user 101 may or may not select the multimodal object provided to the user 101. If the user 101 does not select the multimodal object provided by the object providing module 231, the learning module 233 may infer that the prediction of the multimodal object was not preferred by the user 101 and may store it as past actions of the user 101 for future reference. Also, the learning module 233 may self-learn based on the action of the user 101, for future predictions. Further, the user 101 may voluntarily or upon requesting, provide feedback related to the multimodal object predictions to the object predicting system 105. Based on such feedback, the learning module 233 may self-learn for future predictions.

Further, in some embodiments, the DTM which includes the ideographs and mapping of the ideographs with corresponding metadata, may be updated by the processor 109, upon detecting one or more new ideographs. In some embodiments, the processor 109 may update the DTM, even when the one or more ideographs are removed or deleted. FIG. 2F illustrates a method of updating the DTM.

At block 281, the method includes extracting, by the processor 109 of the object predicting system, metadata description associated with at least one of a new sticker and a new GIF. In some embodiments, the metadata description associated with the new sticker or the new GIF may be minimum, which may result in poor mapping in the DTM. This may lead to situations where such stickers and GIFs may not appear in the multimodal predictions, though they are relevant to the context. Therefore, the processor 109 may enhance the metadata description associated with the new sticker and the new GIF before updating the DTM.

At block 282, the method includes determining, by the processor 109, a predefined number of emojis relevant to each of the one or more keywords identified from the metadata description. In some embodiments, the processor 109 may identify the one or more keywords from the metadata description of the new sticker and the new GIF. Thereafter, the processor 109 may determine the predefined number of emojis, or also referred as the top "K" emojis, which may be relevant to the one or more keywords identified from the metadata description. In some embodiments, the predefined number of emojis may be determined using the one or more neural network techniques such as LSTM techniques.

At block 283, the method includes extracting, by the processor 109, the metadata description associated with each of the predefined number of emojis determined to be relevant to the one or more keywords.

At block 284, the method includes augmenting, by the processor 109, the metadata description associated with each of the predefined number of emojis with the metadata description associated with the corresponding new sticker and the new GIF. In some embodiments, augmenting the metadata description associated with the predefined number of emojis with the metadata description associated with the corresponding new sticker and the new GIF, may enhance the metadata description of the new sticker and the new GIF.

At block 285, the method includes updating, by the processor 109, the DTM with at least one of the new sticker and the new GIF, and the augmented metadata description associated with at least one of the corresponding new sticker and the corresponding new GIF.

In some embodiments, when new emojis are to be updated in the DTM, the processor 109 may directly update the new emoji along with the associated metadata description in the DTM, since the metadata description associated with the new emojis is sufficiently descriptive.

Alternatively, in some other embodiments, the processor 109 may update the DTM using the method as illustrated in the FIG. 2G.

At block 291, the method includes extracting, by the processor 109 of the object predicting system 105, metadata description associated with at least one of a new sticker and a new GIF.

At block 292, the method includes determining, by the processor 109, a plurality of word embeddings associated with each of the one or more keywords identified in the metadata description. In some embodiments, the processor 109 may determine the plurality of word embeddings using one or more word-to-vector models. In some embodiments, the processor 109 may retrieve semantically similar keywords by determining cosine similarity. As an example, for a given sticker or GIF, consider the semantically similar keywords determined using the plurality of word embeddings are happy, joy, sad, unhappy and the like.

At block 293, the method includes filtering, by the processor 109, the plurality of word embeddings based on an emotion associated with the one or more keywords and the corresponding plurality of words embeddings. In some embodiments, the processor 109 may filter the plurality of word embeddings using one or more emo-com models. In the above example of semantically similar keywords, though the keywords are semantically similar, the keywords may not convey the same emotion. As an example, happy and unhappy are two opposite emotions. Similarly, joy and sad are also two opposite emotions, which cannot be related to the same sticker or same GIF because a sticker or a GIF cannot represent two different opposite emotions. Therefore, the processor 109 filters the plurality of word embeddings based on the dimension "emotion", using the emo-com models, to achieve the semantically similar keywords which convey the same emotion. Upon applying the filter, the keywords associated with the sticker are determined to be "Happy" and "Joy". The keywords "Unhappy" and "Sad", which convey the opposite emotion, are filtered.

At block 294, the method includes augmenting, by the processor 109, the filtered plurality of word embeddings with the metadata description associated with at least one of the new sticker and the new GIF.

At block 295, the method includes updating, by the processor 109, the DTM matrix with at least one of the new sticker and the new GIF, and the augmented metadata description associated with at least one of the corresponding new sticker and the corresponding new GIF. This method of updating the DTM allows the processor 109 to determine the plurality of word embeddings for a new sticker or a new GIF, even when there are no corresponding emojis which match the new sticker or the new GIF.

In some embodiments, the present disclosure provides a feature wherein the user 101 may be provided with a unified view of multimodal data, upon searching. The method of generating the unified view of the multimodal data is illustrated via flowchart FIG. 2H.

At block 296, the method includes receiving, by the processor 109 of the object predicting system 105, a text input from a user 101 through a user device 103. In some embodiments, the text input may be a word or a phrase. As an example, the text input may be "Party".

At block 297, the method includes performing, by the processor 109, a unified search in a universal database 107 associated with the object predicting system 105, based on the text input. In some embodiments, the universal database 107 may include, but not limited to, multimodal data related to ideographs, one or more applications configured in the user device 103, and one or more Internet of Things (IoT) devices connected to the user device 103. As an example, the processor 109 may perform the unified search in the universal database 107 to search for multimodal data related to the text input i.e. ideographs related to the emotion "Party", contact details stored as "Party", a document named as "Party", a media file such as an audio content or a video content titled as "Party" from the universal database 107.

At block 298, the method includes generating, by the processor 109, a unified view of the multimodal data related to the text input, retrieved by performing the unified search. In some embodiments, the processor 109 may arrange the multimodal data related to the text input in the unified view based on the relevance of the multimodal data to the text input, and user preference. In some embodiments, the unified view may be also arranged on the basis of usage frequency of the multimodal data, promotion categories and age of the multimodal data i.e., period when the multimodal data was downloaded. An exemplary unified view of the multimodal data for the text input "Party" is as shown in FIG. 1G.

FIG. 3 shows a flowchart illustrating a method of providing personalized multimodal objects in real-time, in accordance with some embodiments of the present disclosure.

As illustrated in FIG. 3, the method 300 includes one or more blocks illustrating a method of providing personalized multimodal objects in real-time. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 configured in an object predicting system 105, a text input from at least one application installed in a user device 103 associated with a user 101.

At block 303, the method 300 may include determining, by the processor 109, an intent of the user 101 by analyzing the text input. In some embodiments, the processor 109 may determine wherein the intent of the user 101 using at least one of, one or more first Deep Neural Networks (DNN) techniques and one or more Long short-term memory (LSTM) techniques.

At block 305, the method 300 may include generating, by the processor 109, a query by correlating the determined intent of the user 101 and contextual data. In some embodiments, the contextual data may include, but not limited to, features of the user device 103, time and location of the user device 103, name and metadata related to one or more applications accessed by the user 101, actions of the user

101 in the one or more applications, user state, device state, and historical data related to corresponding past actions of the user 101.

At block 307, the method 300 may include performing, by the processor 109, a unified search in a universal database 107 associated with the object predicting system 105, based on the query. In some embodiments, the universal database 107 may include, but not limited to, multimodal data that is related to ideographs, one or more applications configured in the user device 103, and one or more Internet of Things (IoT) devices connected to the user device 103.

At block 309, the method 300 may include ranking, by the processor 109, a plurality of multimodal objects predicted in response to the unified search, based on at least one of the contextual data and user preferences. In some embodiments, the processor 109 may rank the plurality of multimodal object predictions using, but not limited to, rule based techniques and one or more second Deep Neural Network (DNN) techniques.

At block 311, the method 300 may include providing, by the processor 109, at least one of the predicted plurality of multimodal objects related to the text input, to the user 101, based on the ranking.

Figure 4:
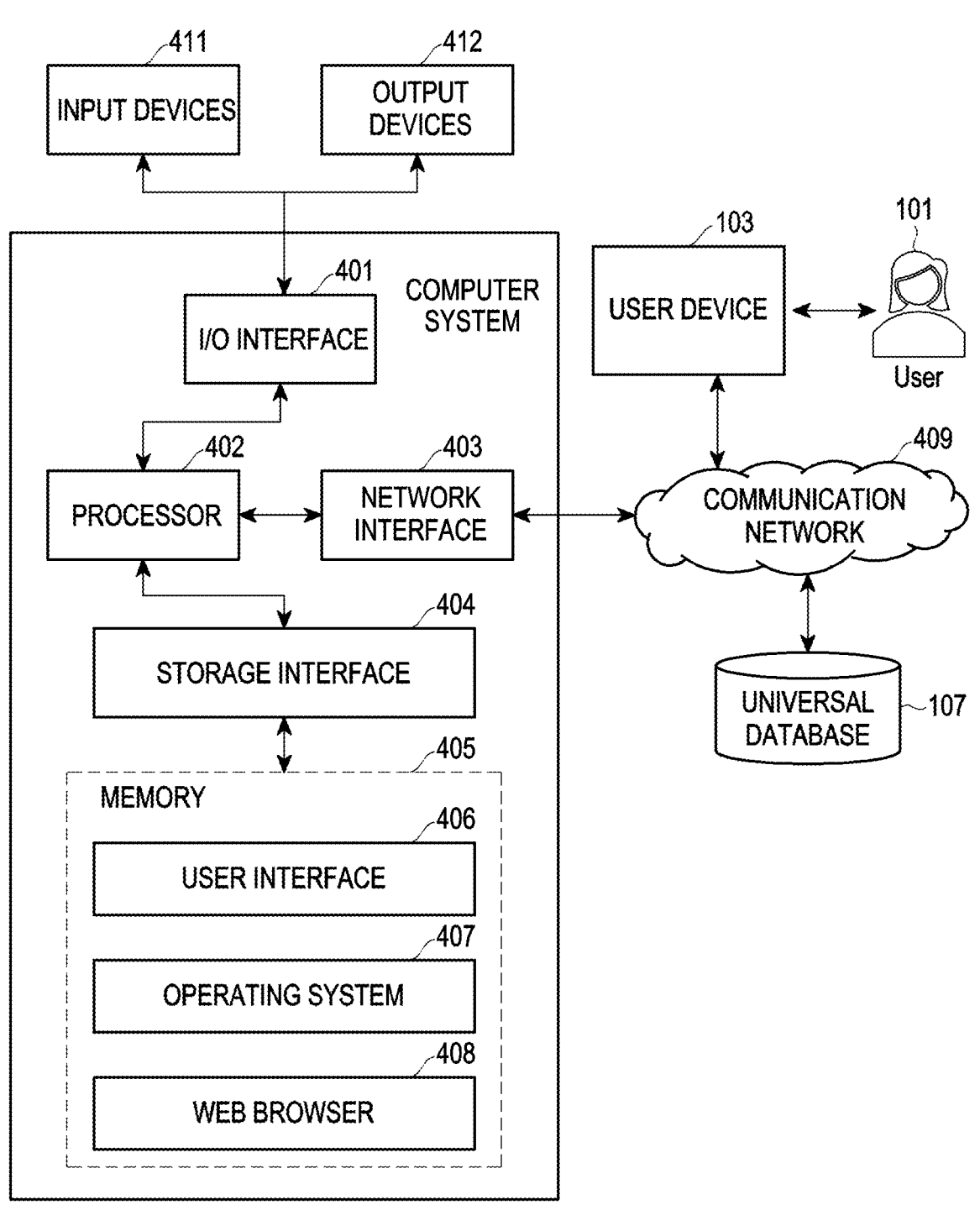
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be an object predicting system 105 that is used for providing personalized multimodal objects, in real-time. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802. n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a universal database 107 and a user through a user device 103. The user device 103 may include, but not limited to, a mobile phone, a laptop, a tablet, a desktop, a smartwatch, and the like. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

Operating system 407 may facilitate resource management and operation of computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. User interface 406 may facilitate display, execution, interaction, manipulation, or operation of program components through textual or graphical facilities. For example, user interfaces may provide computer interaction interface elements on a display system operatively connected to computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

Computer system 400 may implement web browser 408 stored program components. Web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. Computer system 400 may implement a mail server stored program component. The mail server may be an Internet mail server such as Microsoft Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

The present disclosure covers a complete spectrum i.e., the present disclosure provides intelligent multimodal object suggestions related to ideographs, content, services, IoT, Multiple Device Experience (MDE), providers and the like. Therefore, the present disclosure is a one-stop solution for predictions and suggestions related to the complete spectrum of multimodal data.

The present disclosure prioritizes the multimodal object predictions based on the contextual data and user preferences, which ensures providing the most relevant multimodal object predictions to the user.

The present disclosure provides the intelligence to understand, which factors to be considered for prioritizing based on the scenarios. As an example, when the context is related to "watching", the object predicting system may prioritize the content related object predictions rather than the ideographic or textual object predictions.

The present disclosure enables performing personalization at multiple levels. The object predicting system may rank the multimodal object predictions based on the user preferences or based on past actions of the user, which prioritize and personalize the multimodal object predictions for the user. Further, the object predicting system may personalize the multimodal object predictions for the user based on the feedback received from the user. User's preferences may change from time to time based on scenarios and context. Therefore, personalization based on the feedback received from the user personalizes the multimodal object predictions in accordance with the current preferences of the user. Furthermore, the object predicting system may rank the ideographs selected from the Document Term Matrix (DTM) based on the user preferences, which not only provides the ideographs that are relevant to the text input, but also that are relevant to the preferences of the user.

The present disclosure enables performing a unified search in a universal database that comprises multimodal data and also provides the unified view of the results such that, the user can find any kind of data at a single place in the user device.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for providing personalized multimodal objects, in real-time. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising", "having", "containing", and "including", and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a", "an", and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of providing personalized multimodal objects, the method comprising:

obtaining a text input through at least one application installed in an electronic device;

determining an intent of a user of the electronic device based on the text input;

obtaining a query by correlating the determined intent of the user and contextual data;

based on the query, performing a search in a database to generate a prediction of a plurality of multimodal objects based on the determined intent of the user and the contextual data, wherein the database comprises multimodal data related to ideographs, one or more applications configured in the electronic device and one or more internet of things (IoT) devices connected to the electronic device, and wherein the plurality of multimodal objects are predicted using one or more deep neural network (DNN) techniques and a document term matrix (DTM) stored in the database, the DTM comprising the ideographs and mapping of the ideographs with metadata description corresponding to the ideographs;

in response to the search, ranking the plurality of multimodal objects predicted based on at least one of the contextual data and user preferences; and based on the ranking, displaying multimodal objects related to the text input among the predicted plurality of multimodal objects, the displayed multimodal objects comprising a first object indicating an image or text and a second object indicating a list of items associated with the one or more IoT devices.

2. The method of claim 1, wherein the intent of the user is determined using one or more long short-term memory (LSTM) techniques.

3. The method of claim 1, wherein the predicted plurality of multimodal objects are related to at least one of ideographs, image content, video content, audio content, documents, vouchers, text content and stored contacts of the user.

4. The method of claim 1, further comprising:

initiating a self-learning process based on at least one of selection or rejection of the predicted plurality of multimodal objects by the user, feedback of the user for the predicted plurality of multimodal objects, and indication of user preferences by the user.

5. The method of claim 1, wherein the ideographs comprise at least one of emojis, stickers and graphics interchange formats (GIFs).

6. The method of claim 1, further comprising:

updating the DTM in real-time, upon detecting one or more new ideographs.

7. An electronic device for providing personalized multimodal objects, the electronic device comprising:

a memory for storing instructions; and at least one processor configured to execute the stored instructions to at least:

obtain a text input through at least one application installed in the electronic device;

determine an intent of a user of the electronic device based on the text input;

obtain a query by correlating the determined intent of the user and contextual data;

based on the query, perform a search in a database to generate a prediction of a plurality of multimodal objects based on the determined intent of the user and the contextual data, wherein the database comprises multimodal data related to ideographs, one or more applications configured in the electronic device and one or more internet of things (IoT) devices connected to the electronic device, and wherein the plurality of multimodal objects are predicted using one or more deep neural network (DNN) techniques and a document term matrix (DTM) stored in the database, the DTM comprising the ideographs and mapping of the ideographs with metadata description corresponding to the ideographs;

in response to the search, rank the plurality of multimodal objects predicted based on at least one of the contextual data and user preferences; and based on the ranking, display multimodal objects related to the text input among the predicted plurality of multimodal objects, the displayed multimodal objects comprising a first object indicating an image or text and a second object indicating a list of items associated with the one or more IoT devices.

8. The electronic device of claim 7, wherein the processor is further configured to:

determine the intent of the user using one or more long short-term memory (LSTM) techniques.

9. The electronic device of claim 7, wherein:

the predicted plurality of multimodal objects are related to at least one of ideographs, image content, video content, audio content, documents, vouchers, text content and stored contacts of the user, and the ideographs comprise at least one of emojis, stickers and graphics interchange formats (GIFs).

10. The electronic device of claim 7, wherein the at least one processor is further configured to initiate a self-learning process based on at least one of: selection or rejection of the predicted plurality of multimodal objects by the user, feedback of the user for the predicted plurality of multimodal objects, and indication of user preferences by the user.

11. The electronic device of claim 7, wherein the at least one processor is further configured to update the DTM in real-time, upon detecting one or more new ideographs.

12. A non-transitory computer readable medium containing instructions that when executed cause a processor to:

obtain a text input through at least one application installed in an electronic device;

determine an intent of a user of the electronic device based on the text input;

obtain a query by correlating the determined intent of the user and contextual data;

based on the query, perform a search in a database to generate a prediction of a plurality of multimodal objects based on the determined intent of the user and the contextual data, wherein the database comprises multimodal data related to ideographs, one or more applications configured in the electronic device and one or more internet of things (IoT) devices connected to the electronic device, and wherein the plurality of multimodal objects are predicted using one or more deep neural network (DNN) techniques and a document term matrix (DTM) stored in the database, the DTM comprising the ideographs and mapping of the ideographs with metadata description corresponding to the ideographs;

in response to the search, rank the plurality of multimodal objects predicted based on at least one of the contextual data and user preferences; and based on the ranking, display multimodal objects related to the text input among the predicted plurality of multimodal objects, the displayed multimodal objects comprising a first object indicating an image or text and a second object indicating a list of items associated with the one or more IoT devices.

13. The non-transitory computer readable medium of claim 12, wherein the processor is further configured to:

determine the intent of the user using one or more long short-term memory (LSTM) techniques.

14. The non-transitory computer readable medium of claim 12, wherein:

the predicted plurality of multimodal objects are related to at least one of ideographs, image content, video content, audio content, documents, vouchers, text content and stored contacts of the user, and the ideographs comprise at least one of emojis, stickers and graphics interchange formats (GIFs).

15. The non-transitory computer readable medium of claim 12, wherein the processor is further configured to initiate a self-learning process based on at least one of, selection or rejection of the predicted plurality of multimodal objects by the user, feedback of the user for the predicted plurality of multimodal objects, and indication of user preferences by the user.

* * * * *